(12) United States Patent  
Brown Elliott et al.

(10) Patent No.: US 8,031,205 B2
(45) Date of Patent: Oct. 4, 2011

(54) IMAGE DATA SET WITH EMBEDDED PRE-SUBPIXEL RENDERED IMAGE

(75) Inventors: Candice Hellen Brown Elliott, Santa Rosa, CA (US); Michael Francis Higgins, Cazadero, CA (US)

(73) Assignee: Samsung Electronics Co., Ltd. (KR)

( * ) Notice: Subject to any disclaimer, the term of this patent is extended or adjusted under 35 U.S.C. 154(b) by 689 days.

(21) Appl. No.: 12/048,163

(22) Filed: Mar. 13, 2008

(65) Prior Publication Data
US 2008/0158243 A1 Jul. 3, 2008

Related U.S. Application Data

(62) Division of application No. 10/409,413, filed on Apr. 7, 2003, now Pat. No. 7,352,374.

(51) Int. Cl.
*G09G 5/00* (2006.01)
(52) U.S. Cl. ........ 345/613; 345/589; 345/467; 345/469; 345/471; 345/629; 382/294; 348/584; 348/587; 348/590; 348/592; 348/599
(58) Field of Classification Search .................. None
See application file for complete search history.

(56) References Cited

U.S. PATENT DOCUMENTS

| | | |
|---|---|---|
| 3,971,065 A | 7/1976 | Bayer |
| 4,353,062 A | 10/1982 | Lorteije et al. |
| 4,439,759 A | 3/1984 | Fleming et al. |
| 4,593,978 A | 6/1986 | Mourey et al. |
| 4,642,619 A | 2/1987 | Togashi |
| 4,651,148 A | 3/1987 | Takeda et al. |
| 4,751,535 A | 6/1988 | Myers |
| 4,773,737 A | 9/1988 | Yokono et al. |
| 4,786,964 A | 11/1988 | Plummer et al. |
| 4,792,728 A | 12/1988 | Chang et al. |
| 4,800,375 A | 1/1989 | Silverstein et al. |
| 4,853,592 A | 8/1989 | Stratham |
| 4,874,986 A | 10/1989 | Menn et al. |
| 4,886,343 A | 12/1989 | Johnson |
| 4,908,609 A | 3/1990 | Stroomer |
| 4,920,409 A | 4/1990 | Yamagishi |
| 4,946,259 A | 8/1990 | Matino et al. |
| 4,965,565 A | 10/1990 | Noguchi |
| 4,966,441 A | 10/1990 | Conner |

(Continued)

FOREIGN PATENT DOCUMENTS

DE 199 23 527 11/2000

(Continued)

OTHER PUBLICATIONS

Betrisey, C., et al., Displaced Filtering for Patterned Displays, SID Symp. Digest 1999, pp. 296-299.

(Continued)

*Primary Examiner* — Antonio Caschera
(74) *Attorney, Agent, or Firm* — Innovation Counsel LLP

(57) ABSTRACT

Various imaging processing techniques for displaying a pre-subpixel rendered image. The pre-subpixel rendered image can be transmitted directly to a display capable of displaying a subpixel rendered image. The pre-subpixel rendered image can also be stored for later transmission for output to the display. Additionally, the pre-subpixel rendered image can be embedded in an image data stream and later extracted and displayed.

17 Claims, 47 Drawing Sheets

U.S. PATENT DOCUMENTS

| | | |
|---|---|---|
| 4,967,264 A | 10/1990 | Parulski et al. |
| 5,006,840 A | 4/1991 | Hamada et al. |
| 5,052,785 A | 10/1991 | Takimoto et al. |
| 5,062,057 A | 10/1991 | Blacken et al. |
| 5,113,274 A | 5/1992 | Takahashi et al. |
| 5,132,674 A | 7/1992 | Bottorf |
| 5,144,288 A | 9/1992 | Hamada et al. |
| 5,164,831 A | 11/1992 | Kuchta et al. |
| 5,189,404 A | 2/1993 | Masimo et al. |
| 5,196,924 A | 3/1993 | Lumelsky et al. |
| 5,233,385 A | 8/1993 | Sampsell |
| 5,311,337 A | 5/1994 | McCartney, Jr. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,436,747 A | 7/1995 | Suzuki |
| 5,448,652 A | 9/1995 | Vaidyanathan et al. |
| 5,450,216 A | 9/1995 | Kasson |
| 5,461,503 A | 10/1995 | Deffontaines et al. |
| 5,477,240 A | 12/1995 | Huebner et al. |
| 5,535,028 A | 7/1996 | Bae et al. |
| 5,541,653 A | 7/1996 | Peters et al. |
| 5,561,460 A | 10/1996 | Katoh et al. |
| 5,563,621 A | 10/1996 | Silsby |
| 5,579,027 A | 11/1996 | Sakurai et al. |
| 5,642,176 A | 6/1997 | Abukawa et al. |
| 5,648,793 A | 7/1997 | Chen |
| 5,724,442 A | 3/1998 | Ogatsu et al. |
| 5,754,226 A | 5/1998 | Yamada et al. |
| 5,792,579 A | 8/1998 | Phillips |
| 5,815,101 A | 9/1998 | Fonte |
| 5,818,405 A | 10/1998 | Eglit et al. |
| 5,821,913 A | 10/1998 | Mamiya |
| 5,899,550 A | 5/1999 | Masaki |
| 5,903,366 A | 5/1999 | Hirabayashi et al. |
| 5,917,556 A | 6/1999 | Katayama |
| 5,929,843 A | 7/1999 | Tanioka |
| 5,949,496 A | 9/1999 | Kim |
| 5,973,664 A | 10/1999 | Badger |
| 5,987,165 A | 11/1999 | Matsuzaki et al. |
| 6,002,446 A | 12/1999 | Eglit |
| 6,005,582 A | 12/1999 | Gabriel et al. |
| 6,008,868 A | 12/1999 | Silverbrook |
| 6,034,666 A | 3/2000 | Kanai et al. |
| 6,038,031 A | 3/2000 | Murphy |
| 6,049,626 A | 4/2000 | Kim |
| 6,061,533 A | 5/2000 | Kajiwara |
| 6,064,363 A | 5/2000 | Kwon |
| 6,097,367 A | 8/2000 | Kuriwaki et al. |
| 6,108,122 A | 8/2000 | Ulrich et al. |
| 6,144,352 A | 11/2000 | Matsuda et al. |
| 6,160,535 A | 12/2000 | Park |
| 6,184,903 B1 | 2/2001 | Omori |
| 6,188,385 B1 | 2/2001 | Hill et al. |
| 6,198,507 B1 | 3/2001 | Ishigami |
| 6,219,025 B1 | 4/2001 | Hill et al. |
| 6,225,967 B1 | 5/2001 | Hebiguchi |
| 6,225,973 B1 | 5/2001 | Hill et al. |
| 6,236,390 B1 | 5/2001 | Hitchcock |
| 6,239,783 B1 | 5/2001 | Hill et al. |
| 6,243,055 B1 | 6/2001 | Fergason |
| 6,243,070 B1 | 6/2001 | Hill et al. |
| 6,262,710 B1 | 7/2001 | Smith |
| 6,271,891 B1 | 8/2001 | Ogawa et al. |
| 6,278,434 B1 | 8/2001 | Hill et al. |
| 6,297,826 B1 | 10/2001 | Semba et al. |
| 6,299,329 B1 | 10/2001 | Mui et al. |
| 6,326,981 B1 | 12/2001 | Mori et al. |
| 6,327,008 B1 | 12/2001 | Fujiyoshi |
| 6,332,030 B1 | 12/2001 | Manjunath et al. |
| 6,348,929 B1 | 2/2002 | Acharya et al. |
| 6,356,297 B1 | 3/2002 | Cheng et al. |
| 6,360,023 B1 | 3/2002 | Betrisey et al. |
| 6,377,262 B1 | 4/2002 | Hitchcock et al. |
| 6,392,717 B1 | 5/2002 | Kunzman |
| 6,393,145 B2 | 5/2002 | Betrisey et al. |
| 6,396,505 B1 | 5/2002 | Lui et al. |
| 6,414,719 B1 | 7/2002 | Parikh |
| 6,441,867 B1 | 8/2002 | Daly |
| 6,453,067 B1 | 9/2002 | Morgan et al. |
| 6,466,618 B1 | 10/2002 | Messing et al. |
| 6,469,766 B2 | 10/2002 | Waterman et al. |
| 6,590,996 B1 | 7/2003 | Reed et al. |
| 6,633,302 B1 | 10/2003 | Ohsawa et al. |
| 6,661,429 B1 | 12/2003 | Phan |
| 6,674,436 B1 | 1/2004 | Dresevic et al. |
| 6,681,053 B1 | 1/2004 | Zhu |
| 6,700,991 B1 | 3/2004 | Wu et al. |
| 6,714,206 B1 | 3/2004 | Martin et al. |
| 6,714,212 B1 | 3/2004 | Tsuboyama et al. |
| 6,714,243 B1 | 3/2004 | Mathur et al. |
| 6,750,875 B1 | 6/2004 | Keely, Jr. et al. |
| 6,771,028 B1 | 8/2004 | Winters |
| 6,801,220 B2 | 10/2004 | Greier et al. |
| 6,804,407 B2 | 10/2004 | Weldy |
| 6,833,890 B2 | 12/2004 | Hong et al. |
| 6,836,300 B2 | 12/2004 | Choo et al. |
| 6,850,294 B2 | 2/2005 | Roh et al. |
| 6,856,704 B1 | 2/2005 | Gallagher et al. |
| 6,867,549 B2 | 3/2005 | Cok et al. |
| 6,885,380 B1 | 4/2005 | Primerano et al. |
| 6,888,604 B2 | 5/2005 | Rho et al. |
| 6,897,876 B2 | 5/2005 | Murdoch et al. |
| 6,909,438 B1 * | 6/2005 | White et al. .................. 345/629 |
| 6,989,876 B2 | 1/2006 | Song et al. |
| 7,024,054 B2 * | 4/2006 | Cahill et al. .................. 382/294 |
| 7,184,066 B2 | 2/2007 | Elliott et al. |
| 7,460,130 B2 * | 12/2008 | Salganicoff .................. 345/590 |
| 2001/0017515 A1 | 8/2001 | Kusunoki et al. |
| 2001/0040645 A1 | 11/2001 | Yamazaki |
| 2002/0012071 A1 | 1/2002 | Sun |
| 2002/0017645 A1 | 2/2002 | Yamazaki et al. |
| 2002/0122160 A1 | 9/2002 | Kunzman |
| 2002/0140831 A1 | 10/2002 | Hayashi |
| 2002/0190648 A1 | 12/2002 | Bechtel et al. |
| 2003/0011613 A1 | 1/2003 | Booth, Jr. |
| 2003/0034992 A1 | 2/2003 | Brown Elliott et al. |
| 2003/0043567 A1 | 3/2003 | Hoelen et al. |
| 2003/0058466 A1 | 3/2003 | Hoshuyama |
| 2003/0071775 A1 | 4/2003 | Ohashi et al. |
| 2003/0071826 A1 | 4/2003 | Goertzen |
| 2003/0071943 A1 | 4/2003 | Choo et al. |
| 2003/0085906 A1 | 5/2003 | Elliott et al. |
| 2004/0021804 A1 | 2/2004 | Hong et al. |
| 2004/0061710 A1 | 4/2004 | Messing et al. |
| 2004/0075764 A1 | 4/2004 | Law et al. |
| 2004/0095521 A1 | 5/2004 | Song et al. |
| 2004/0114046 A1 | 6/2004 | Lee et al. |
| 2004/0169807 A1 | 9/2004 | Rho et al. |
| 2004/0174389 A1 | 9/2004 | Ben-David et al. |
| 2004/0189662 A1 | 9/2004 | Frisken et al. |
| 2004/0189664 A1 | 9/2004 | Frisken et al. |
| 2004/0213449 A1 | 10/2004 | Safaee-Rad et al. |
| 2004/0239813 A1 | 12/2004 | Klompenhouwer |
| 2004/0239837 A1 | 12/2004 | Hong et al. |
| 2005/0001856 A1 | 1/2005 | Sparre et al. |
| 2005/0024380 A1 | 2/2005 | Lin et al. |
| 2005/0031199 A1 | 2/2005 | Ben-Chorin et al. |
| 2005/0040760 A1 | 2/2005 | Taguchi et al. |
| 2005/0068477 A1 | 3/2005 | Shin et al. |
| 2005/0140634 A1 | 6/2005 | Takatori |
| 2005/0169551 A1 | 8/2005 | Messing et al. |

FOREIGN PATENT DOCUMENTS

| | | | |
|---|---|---|---|
| EP | 0 322 106 A2 | | 6/1989 |
| EP | 0 793 214 A1 | | 2/1996 |
| EP | 0 899 604 A2 | | 3/1999 |
| EP | 1 083 539 A2 | | 3/2001 |
| EP | 1 308 923 A1 | | 5/2003 |
| JP | 60-107022 | | 6/1985 |
| JP | 02-983027 B2 | | 4/1991 |
| JP | 03-78390 | | 4/1991 |
| JP | 06-102503 | | 4/1994 |
| JP | 2002215082 A | | 7/2002 |
| JP | 2002-287687 A | * | 10/2002 |
| JP | 2004-004822 | | 1/2004 |

| | | |
|---|---|---|
| TW | 451171 | 8/2001 |
| TW | 474104 | 1/2003 |
| WO | WO 00/21067 | 4/2000 |
| WO | WO 00/42564 | 7/2000 |
| WO | WO 00/67196 | 11/2000 |
| WO | WO 01/29817 A1 | 4/2001 |
| WO | 02/088979 A1 | 11/2002 |
| WO | 03015066 A2 * | 2/2003 |
| WO | WO 2004/021323 A2 | 3/2004 |
| WO | WO 2004/040548 | 5/2004 |
| WO | WO 2006/107979 A2 | 10/2006 |

OTHER PUBLICATIONS

Brown Elliott, C., "Active Matrix Display . . . ", IDMC 2000, 185-189, Aug. 2000.
Brown Elliott, C., "Color Subpixel Rendering Projectors and Flat Panel Displays," SMPTE, Feb. 27-Mar. 1, 2003, Seattle, WA pp. 1-4.
Brown Elliott, C, "Co-Optimization of Color AMLCD Subpixel Architecture and Rendering Algorithms," SID 2002 Proceedings Paper, May 30, 2002 pp. 172-175.
Brown Elliott, C, "Development of the PenTile Matrix™ Color AMLCD Subpixel Architecture and Rendering Algorithms", SID 2003, Journal Article.
Brown Elliott, C, "New Pixel Layout for PenTile Matrix™ Architecture", IDMC 2002, pp. 115-117.
Brown Elliott, C, "Pentile Matrix™ Displays and Drivers" ADEAC Proceedings Paper, Portland OR., Oct. 2005.
Brown Elliott, C, "Reducing Pixel Count Without Reducing Image Quality", Information Display Dec. 1999, vol. 1, pp. 22-25.
Carvajal, D., "Big Publishers Looking Into Digital Books," The NY Times, Apr. 3, 2000, Business/ Financial Desk.
"ClearType magnified", Wired Magazine, Nov. 8, 1999, Microsoft Typography, article posted Nov. 8, 1999, 1 page.
Credelle, Thomas, "P-00: MTF of High-Resolution PenTile Matrix Displays", Eurodisplay 02 Digest, 2002 pp. 1-4.
Daly, Scott, "Analysis of Subtriad Addressing Algorithms by Visual System Models",SID Symp. Digest, Jun. 2001 pp. 1200-1203.
E-Reader Devices and Software, Jan. 1, 2001, Syllabus, http://www.campus-technology.com/article.asp?id=419.
Feigenblatt, R.I., Full-color imaging on amplitude-quantized color mosaic displays, SPIE, 1989, pp. 199-204.
Feigenblatt, Ron, "Remarks on Microsoft ClearType™", http://www.qeocities.com/SiliconValley/Ridge/6664/ClearType.html, Dec. 5, 1998, Dec. 7, 1998, Dec. 12, 1999, Dec. 26, 1999, Dec. 30, 1999 and Jun. 19, 2000, 30 pages.
Johnston, Stuart, "An Easy Read: Microsoft's ClearType," InformationWeek Online, Redmond WA, Nov. 23, 1998. 3 pages.
Johnston, Stuart, "Clarifying ClearType," InformationWeek Online, Redmond WA, Jan. 4, 1999, 4 pages.
Just Outta Beta, Wired Magazine, Dec. 1999 Issue 7-12, 3 pages.
Klompenhouwer, Michiel, Subpixel Image Scaling for Color Matrix Displays, SID Symp. Digest, May 2002, pp. 176-179.
Lee, Baek-woon et al., 40.5L: Late-News Paper: TFT-LCD with RGBW Color system, SID 03 Digest, 2003, pp. 1212-1215.
Markoff, John, Microsoft's Cleartype Sets Off Debate on Originality, NY Times, Dec. 7, 1998, 5 pages.
Martin, R., et al., "Detectability of Reduced Blue-Pixel Count in Projection Displays," SID Symp. Digest, May 1993, pp. 606-609.
Messing, Dean et al., Improved Display Resolution of Subsampled Colour Images Using Subpixel Addressing, IEEE ICIP 2002, vol. 1, pp. 625-628.
Messing, Dean et al., Subpixel Rendering on Non-Striped Colour Matrix Displays, 2003 International Conf on Image Processing, Sep. 2003, Barcelona, Spain, 4 pages.
"Microsoft ClearType," website, Mar. 26, 2003, 4 pages.
Microsoft press release, Microsoft Research Announces Screen Display Breakthrough at COMDEX/Fall '98; . . . Nov. 15, 1998.
Murch, M., "Visual Perception Basics," SID Seminar, 1987, Tektronix Inc, Beaverton Oregon.
Okumura et al., "A New Flicker-Reduction Drive Method for High Resolution LCTVs", SID Digest,pp. 551-554, 2001.
Platt, John, Optimal Filtering for Patterned Displays, IEEE Signal Processing Letters, 2000, 4 pages.
PCT International Search Report dated Sep. 30, 2003 for PCT/US02/24994 (U.S. Appl. No. 10/215,843).
PCT International Search Report dated Aug. 10, 2006 for PCT/US04/05196 (U.S. Appl. No. 10/409,413).
PCT International Search Report dated Apr. 23, 2007 for PCT/US06/12521 (U.S. Appl. No. 60/668,578).
EP Search Report, EP10184633, Jun. 17, 2011, 2 pages.
EP Search Report, EP10184603, Jun. 8, 2011, 6 pages.

* cited by examiner

IMAGE DATA SET WITH EMBEDDED PRE-SUBPIXEL RENDERED IMAGE

This application is a divisional of U.S. patent application Ser. No. 10/409,413, filed on Apr. 7, 2003, and claims the benefit of priority thereof. U.S. patent application Ser. No. 10/409,413 is published as US Patent Application Publication US 2004/0196297, which is hereby incorporated by reference.

BACKGROUND

In commonly owned U.S. patent applications: (1) United States Publication No. 2002/0015110 ("the '110 application) [Ser. No. 09/916,232] entitled "ARRANGEMENT OF COLOR PIXELS FOR FULL COLOR IMAGING DEVICES WITH SIMPLIFIED ADDRESSING," filed Jul. 25, 2001; (2) United States Publication No. 2003/0128225 ("the '225 application) [Ser. No. 10/278,353] entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) United States Publication No. 2003/0128719 ("the '719 application) [Ser. No. 10/278,352] entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUBPIXELS," filed Oct. 22, 2002; (4) United States Publication No. 2004/0051724 ("the '724 application) [Ser. No. 10/243,094] entitled "IMPROVED FOUR COLOR ARRANGEMENTS AND EMITTERS FOR SUBPIXEL RENDERING," filed Sep. 13, 2002; (5) United States Publication No. 2003/0117423 ("the '423 application) [Ser. No. 10/278,328] entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) United States Publication No. 2003/0090581 ("the '581 application) [Ser. No. 10/278,393] entitled "COLOR DISPLAY HAVING HORIZONTAL SUB-PIXEL ARRANGEMENTS AND LAYOUTS," filed Oct. 22, 2002, novel subpixel arrangements are therein disclosed for improving the cost/performance curves for image display devices and herein incorporated by reference.

These improvements are particularly pronounced when coupled with subpixel rendering (SPR) systems and methods further disclosed in those applications and in commonly owned U.S. patent applications: (1) United States Publication No. 2003/0034992 ("the '992 application) [Ser. No. 10/051,612]entitled "CONVERSION OF A SUB PIXEL FORMAT DATA TO ANOTHER SUB-PIXEL DATA FORMAT," filed Jan. 16, 2002; (2) United States Publication No. 2003/0103058 ("the '058 application) [Ser. No. 10/150,355] entitled "METHODS AND SYSTEMS FOR SUB-PIXEL RENDERING WITH GAMMA ADJUSTMENT," filed May 17, 2002; (3) United States Publication No. 2003/0085906 ("the '906 application) [Ser. No. 10/215,843] entitled "METHODS AND SYSTEMS FOR SUB-PIXEL RENDERING WITH ADAPTIVE FILTERING," filed Aug. 8, 2002. The above-referenced and commonly owned applications are hereby incorporated herein by reference.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

FIG. 18 shows a data set that has an embedded pre-subpixel rendered data set with a predefined color key data set.

FIG. 26A shows a conventional data set with an embedded subpixel rendered data set for the arrangement of subpixel of FIG. 24A with an alternative predefined chroma key data set.

DETAILED DESCRIPTION

Reference will now be made in detail to implementations and embodiments, examples of which are illustrated in the accompanying drawings. Wherever possible, the same reference numbers will be used throughout the drawings to refer to the same or like parts.

Subpixel Rendering Systems

As previously disclosed in the above-referenced and commonly owned '225 application, previous systems take advantage of the characteristics of the Human Vision System and focus on bandwidth reduction using "perceptual encoding." This type of encoding creates 'visually lossless' but mathematically lossy compression, between image capture and image display. However, the image is decoded back into the conventional data set just prior to being sent to the physical display device.

To aid in understanding the previous system, a specific example is explained for the previous system. First, an image is captured by a digital still camera, processed and compressed using the Joint Picture Experts Group (JPEG) image compression standard or the Moving Pictures Experts Group (MPEG) compression standard. These types of compression convert conventional RGB data set to $YC_BC_R$ data set that is well known in the art. This data set has a luminance like component and two chroma components that represent the difference between the luminance like component and blue and red, respectively, of the conventional RGB data set. It is common practice to subsample the two chroma components, since the Human Vision System has less spatial frequency discrimination in the chroma channels. This causes part of the mathematical lossy compression, but is not significant visually. Several schemes are known in the art, given such cryptic sounding, but well understood, designations as "4:2:2" and "4:2:0", the former representing a compression of 3:2 (1.5:1), the latter representing a compression ratio of 2:1. After further compression, using image transforms, lossless or lossy quantization, and data compression, the image may be stored or transmitted.

Consequently, at some other place or time, the image may be received, retrieved, decompressed, converted back to YCBCR data, the missing chroma samples interpolated to fill in the gaps, finally to be converted back to R'G'B' data set (the prime "'" symbol indicating that the data has been modified by the chroma filtering operation). In prior displays, the R'G'B' data set is then directed to the display. Furthermore, in prior displays, the full RGB data bandwidth is utilized, even though the Human Vision System does not recognize the color components at that resolution, and many images may already be filtered to match the Human Vision System, further indicating a waste of the bandwidth.

Figure 7:
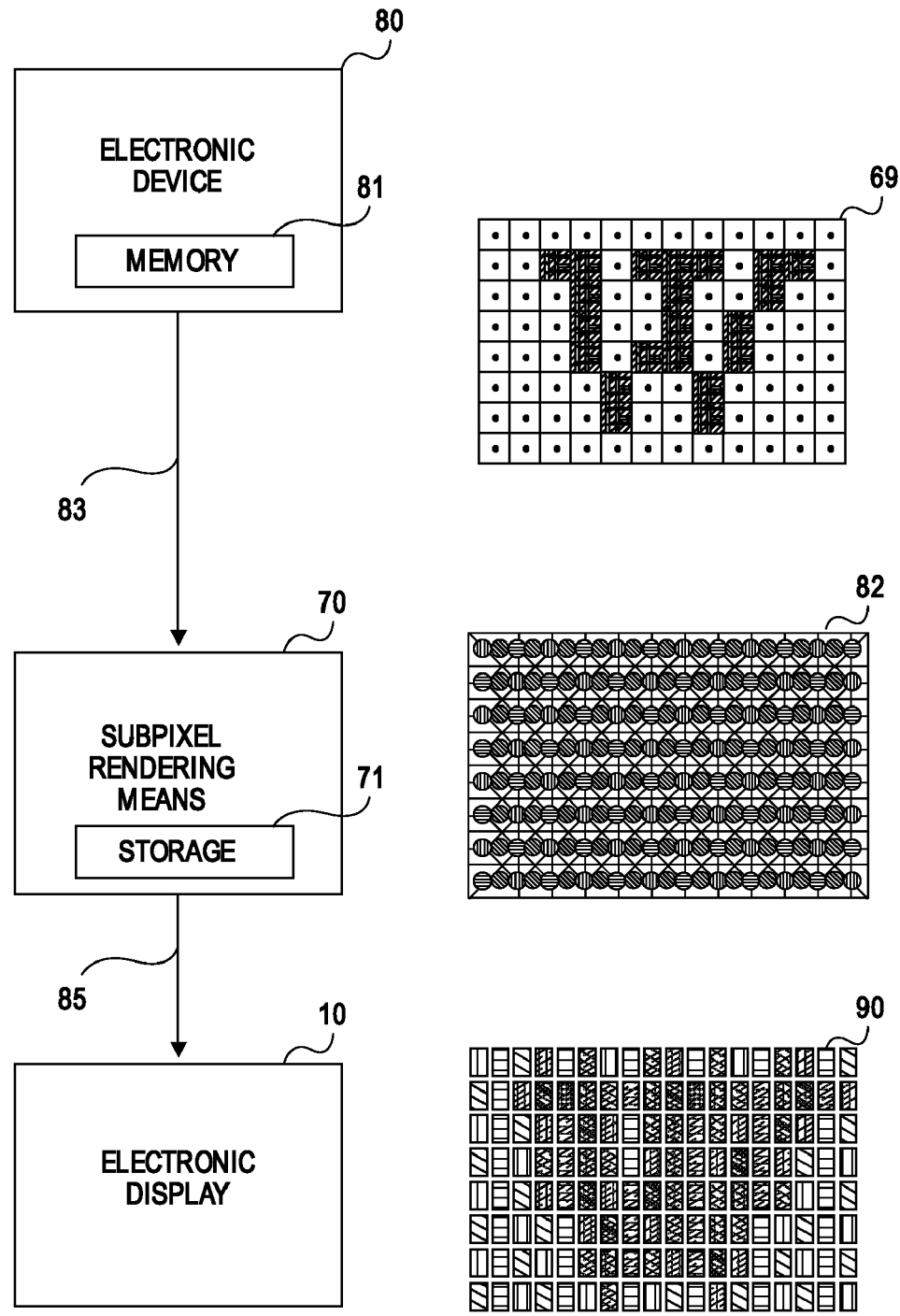
FIG. 7 depicts the subpixel rendering data pipeline.

Referring to FIG. 7, the following embodiments reduce the bandwidth requirement inside of the display 10 and the data transmission path 85 to the display 10. In particular, to illustrate an example of the manner in which bandwidth is reduced, consider the prior art data set 69 with image 65 of FIGS. 5A and 5B, stored in memory 81 of the electronic device 80, of FIG. 7. Let us assume that the image is twelve (12) by eight (8) pixel by three color planes, red, green, and blue, each plane having the same number of bits representing an intensity of each color, perhaps eight (8). This image would then have 12×8×3×8=2304 binary bits representing it in the conventional data set format.

Figure 6A:
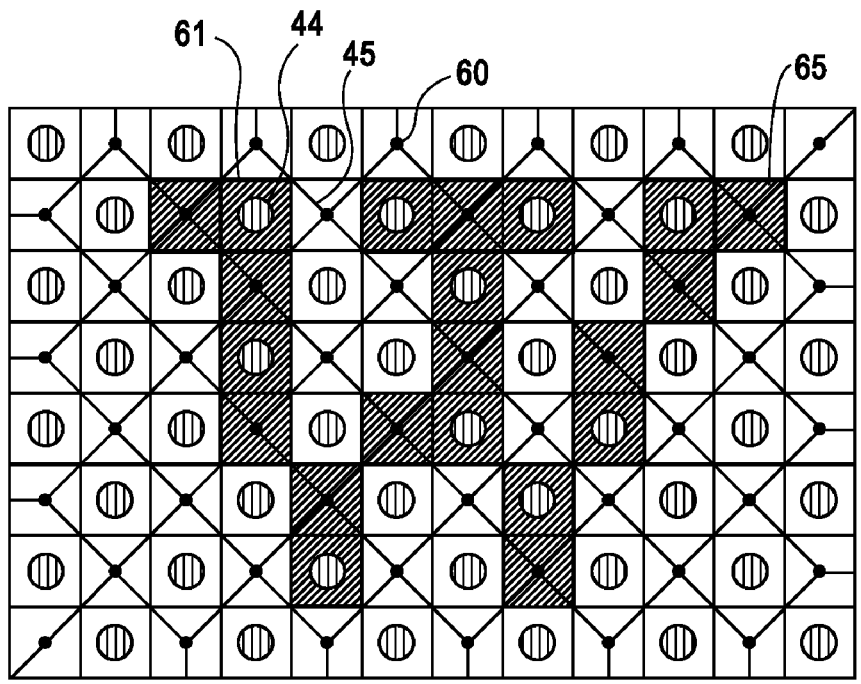
FIGS. 6A, 6B, and 6C show the red, green, and blue resample planes of FIGS. 4A, 4B, and 4C, respectively, overlaid onto data set of FIG. 5B with the rendered "w."
Figure 6B:
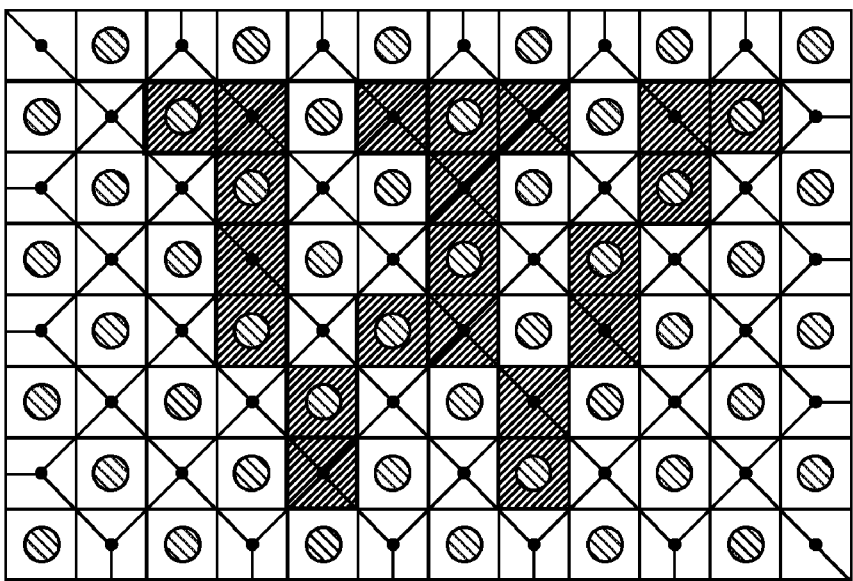
Figure 6C:
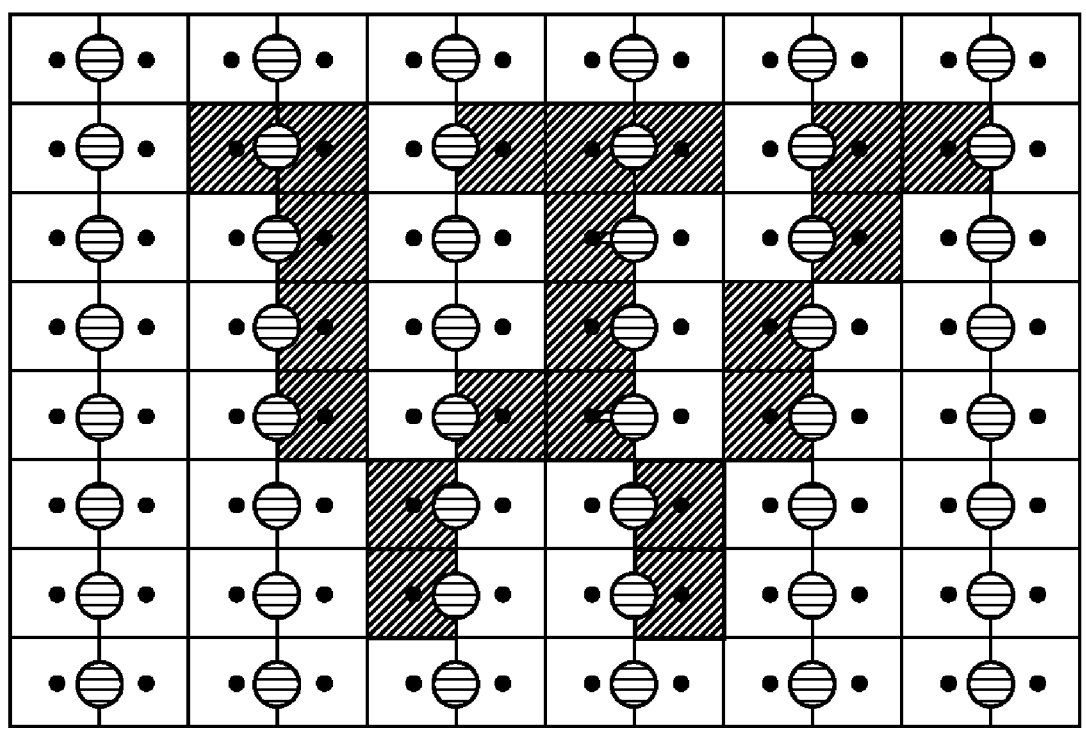

Electronic device 80 typically generates, receives, or extracts from a memory medium 81, the image data set 69. Examples of electronic device 80 include a computer, television receiver, video player, digital cell phone, or other like electronic device that may output an image for display. Examples of memory medium 81 include any of magnetic tape, Random Access Memory (RAM), Read Only Memory (ROM), Compact Disc (CD), Digital Video Disc (DVD), flexible magnetic disc "floppy", Hard magnetic Drive (HD), or any other suitable memory medium. Data set 69 is delivered via data path 83 to a subpixel rendering means 70 that uses any suitable algorithm, an example of which is resample filter coefficients generated by the use of the resample areas 82, such as those of FIGS. 4A, 4B, and 4C, that are overlaid on conventional data 69, as shown in FIGS. 6A, 6B, and 6C. Subpixel rendering means 70 may include any combination of hardware and/or software to implement the subpixel rendering techniques described herein. The result of this operation, which reduces the number of data samples, is delivered by a second data path 85 to an electronic display 10 to create the resulting image 90.

In our example, data set 69 transferred to the subpixel rendering means 70 is 2304 binary bits. For a display 90 with the arrangement of subpixels 10 of FIGS. 1, 2, or 3, the resulting subpixel rendered data set 1719, shown in FIG. 16B, transferred is reduced to 1152 binary bits, representing a 2:1 compression ratio. For a display with the arrangement 2510 of FIG. 24A, the resulting data set would be 1536 binary bits, representing a compression ratio of 3:2 (1.5:1). For displays with the arrangements such as those shown in FIGS. 21 and 22, the resulting data sets can be 960 binary bits, representing a compression ratio of 12:5 (2.4:1).

Since it is common that images are refreshed on the display device by resending an image, or in the case of motion pictures, sending a new image, multiple times a second, typically sixty (60) or more times a second, the reduction in bandwidth for a fixed refresh rate equates to a reduction in bits/second transmitted from the subpixel rendering means 70 to the display 10 in FIG. 7. This reduction in bits/second reduces the power required to transmit the image(s). It may also reduce the cost, as parallel channels may be reduced or eliminated. Reduced bandwidth may also reduce the stray electromagnetic interference (EMI) emitted by the transmission means 85. This may result in cost reduction as EMI shielding may be reduced or eliminated.

Referring to FIG. 7, data path/transmission means 85 may form the electronics in the display itself. Each column driver output must be supplied with the data for each row update, as is well known in the art. With the display arrangements discussed herein and those in the above-referenced and commonly owned applications, the number of such column driver outputs is reduced in direct proportion to the bandwidth reduction. Thus, the number of associated data latches, digital-to-analog converters (D/A), and data bus circuit elements may also be reduced, reducing the cost of the display.

Examples of the data path/transmission means 85 include a digital video interface (DVI) transmitter/receiver pair between a computer and a flat panel display monitor, plus the electronics in the flat panel display itself. For high resolution displays, it is often necessary that multiple channels, multiple pairs of transmitters and receivers are used to handle the bandwidth requirements at a given refresh rate. With subpixel rendering compression, the number of channels may be reduced, perhaps to only one. Further, for a given bandwidth, the refresh rate may be increased using subpixel rendering compression, potentially eliminating flicker perception or jitter.

Further examples of data path/transmission means 85 include an analog transmitter/receiver pair between a computer and a flat panel display monitor, plus the electronics in the flat panel display itself. Analog systems are commonly used to drive analog Cathode Ray Tube (CRT) monitors. Recently, Liquid Crystal Display monitors have used analog-to-digital (D/A) converters to allow it to receive and display said analog signals. At high resolutions, the analog signal may be degraded due to bandwidth limitations on the analog signal path, causing intensity values to be changed due to noise, or timing to be shifted, causing pixel jitter. Using the arrangements described in this document and those referenced in the prior applications, along with matching subpixel rendering will allow the signal bandwidth to be reduced, increasing the reliability and stability of the system. Data path/transmission means 85 may also include an entire image system, from image capture to final display, such as those shown in FIG. 20 and more fully described below.

Subpixel Rendering Methods

Figure 1:
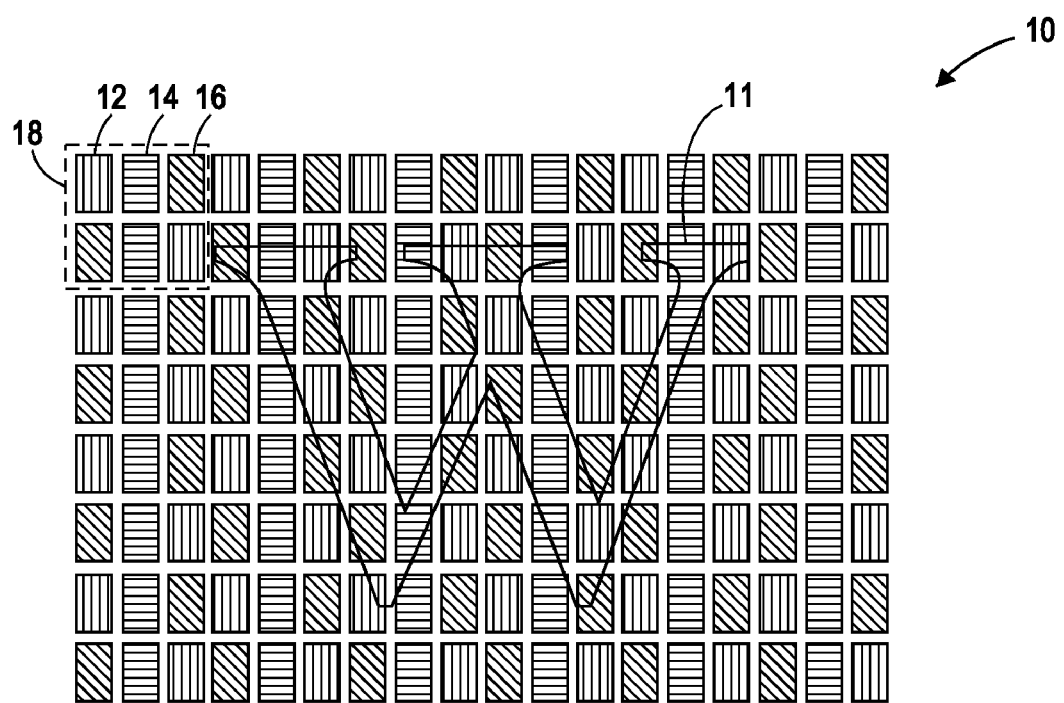
FIG. 1 shows an arrangement of subpixels of an electronic color display with the outline of an idealized "w" character superimposed upon it.

FIG. 1 shows the outline of an idealized "w" character 11 in a New Times Roman font superimposed on an arrangement of subpixels for electronic color display 10 of FIG. 7—upon which the 'w' is to be rendered. Other fonts may be used for the subpixel arrangement, the choice of this font and letter is merely for illustrative purposes. This subpixel arrangement comprises a repeating subpixel grouping 18 having red subpixels 12 and green subpixels 16 on a checkerboard pattern, with blue subpixels 14 in the center. This particular subpixel arrangement is further disclosed in the above-referenced and commonly owned '110 application.

Figure 2:
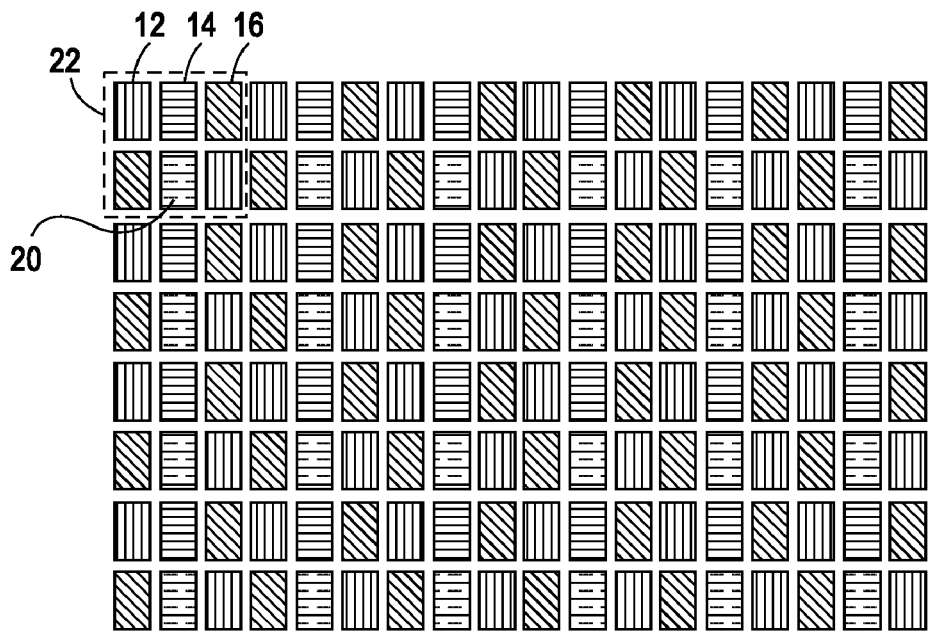
FIG. 2 shows another arrangement of subpixels of an electronic color display.
Figure 3:
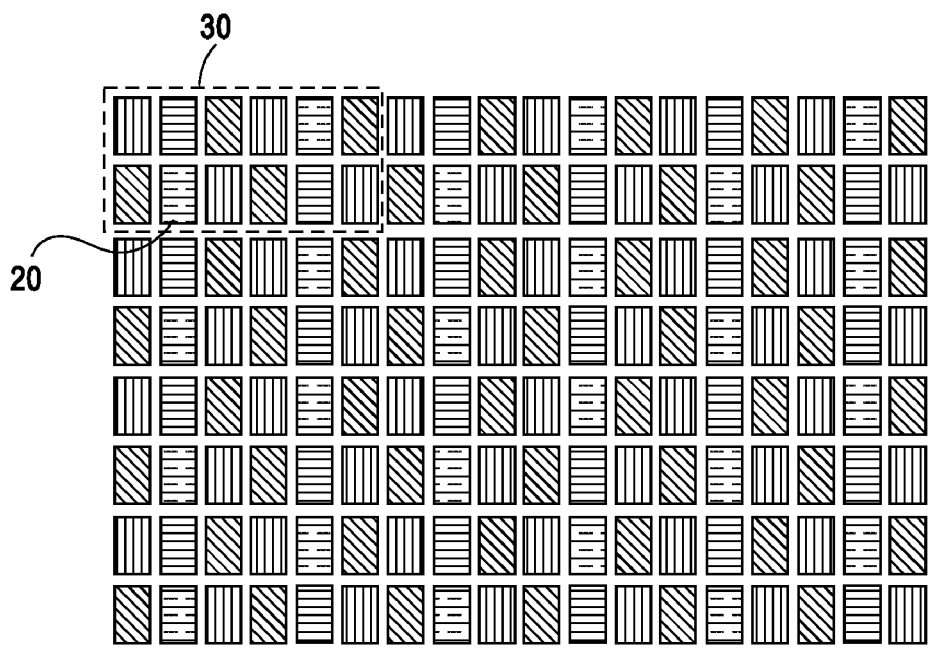
FIG. 3 shows yet another arrangement of subpixels of an electronic color display.

While the following discussion will focus on the arrangement of FIG. 1 for the purposes of illustration only, other arrangements of subpixels for displays suffice for the purposes of the present invention, such as those shown in FIGS. 2 and 3, among others further disclosed in the above-referenced and commonly owned applications. FIG. 2 shows one such embodiment wherein the subpixel repeating group 22 comprises a fourth color subpixel 20. Subpixel 20 can be staggered as shown in the subpixel repeating group 30 of FIG. 3. These and many other configurations are disclosed in the above-referenced and commonly owned applications.

Figure 4A:
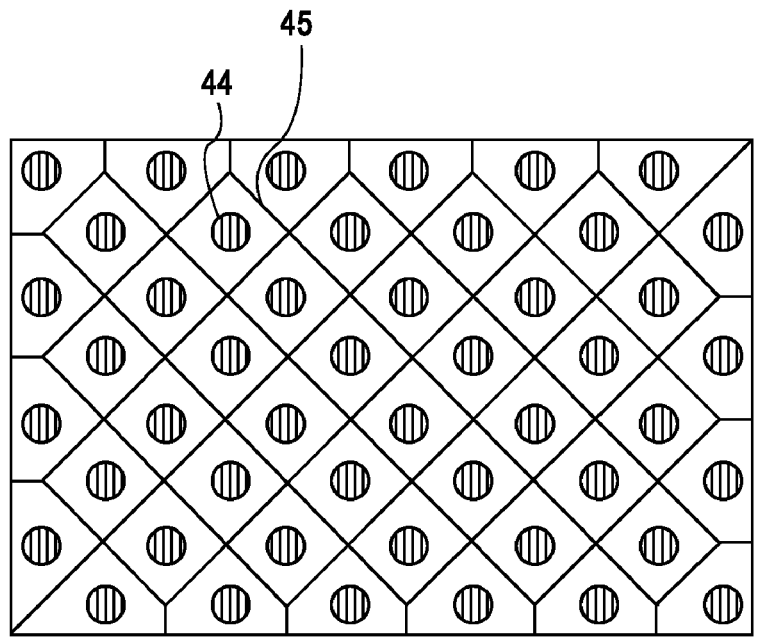
FIGS. 4A, 4B, and 4C show the reconstruction points and associated resample areas for the red, green, and blue color planes, respectively, for the arrangement of subpixels of FIG. 1.
Figure 4B:
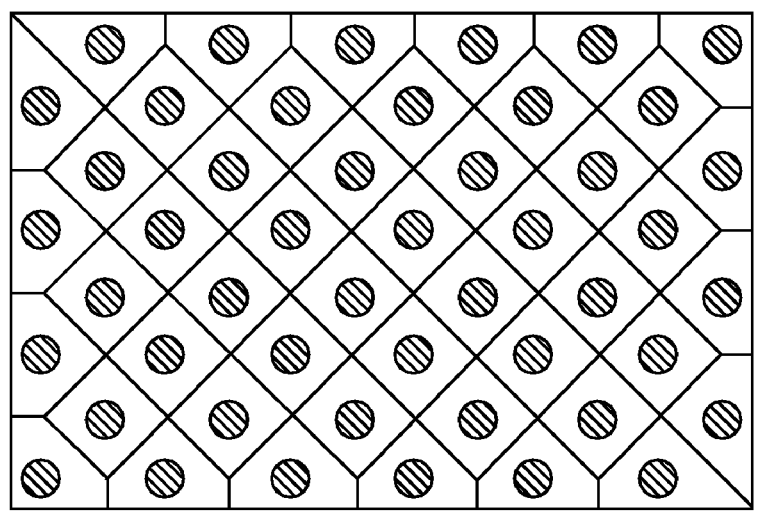
Figure 4C:
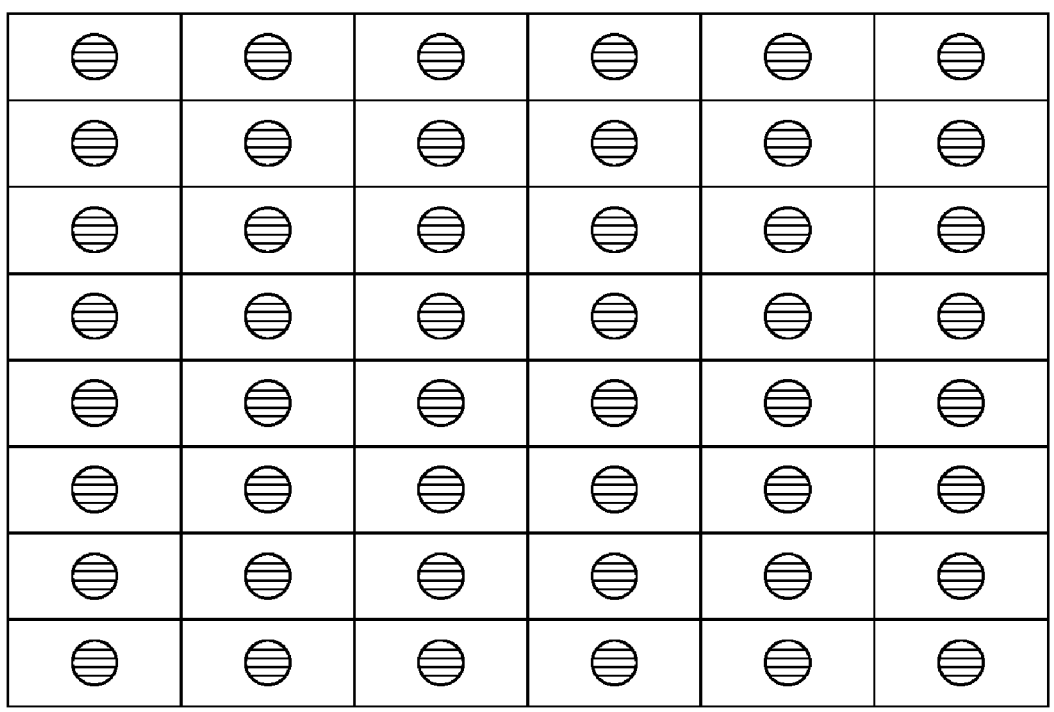

FIGS. 4A, 4B, and 4C show the reconstruction points and associated resample areas for the red, green, and blue color planes, respectively, for the arrangement of subpixels of FIG. 1, as explained in the '992 application. These reconstruction points and their resample areas are employed—as explained below—to perform subpixel rendering.

Figure 5A:
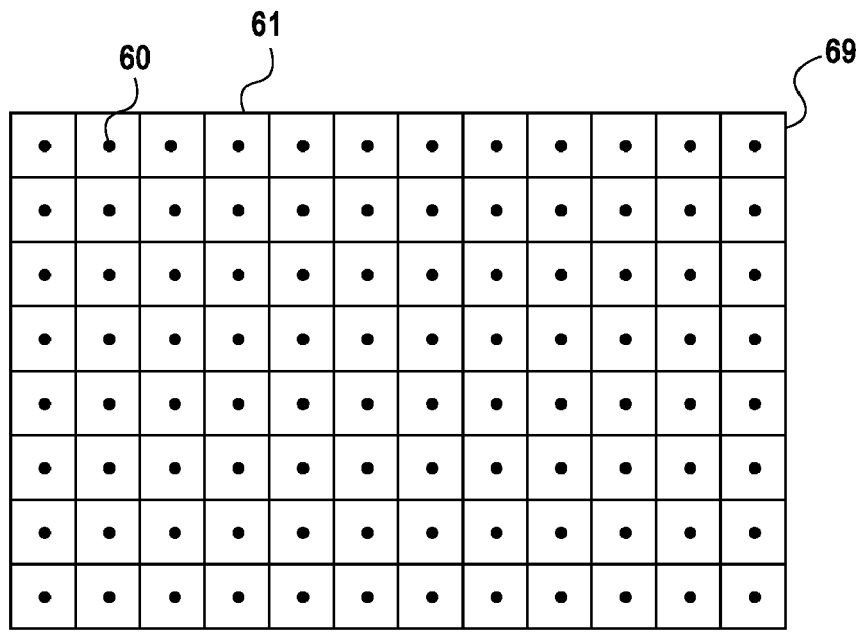
FIG. 5A shows the sample points and associated implied sample areas of a conventional color image data set.

FIG. 5A shows a color image data set 69 in which red, green, and blue data are coincidentally sampled and here represented as dots 60 in a rectilinear equidistant array. Color image data set 69 might, for example, represent the image data set for a traditional RGB display such as a Cathode Ray Tube or a Liquid Crystal Display with Red, Green, and Blue stripes, grouped together in triplets. An implied sample area 61 might be associated with each sample point 60—thus, forming a grid of square sample areas 61.

Figure 5B:
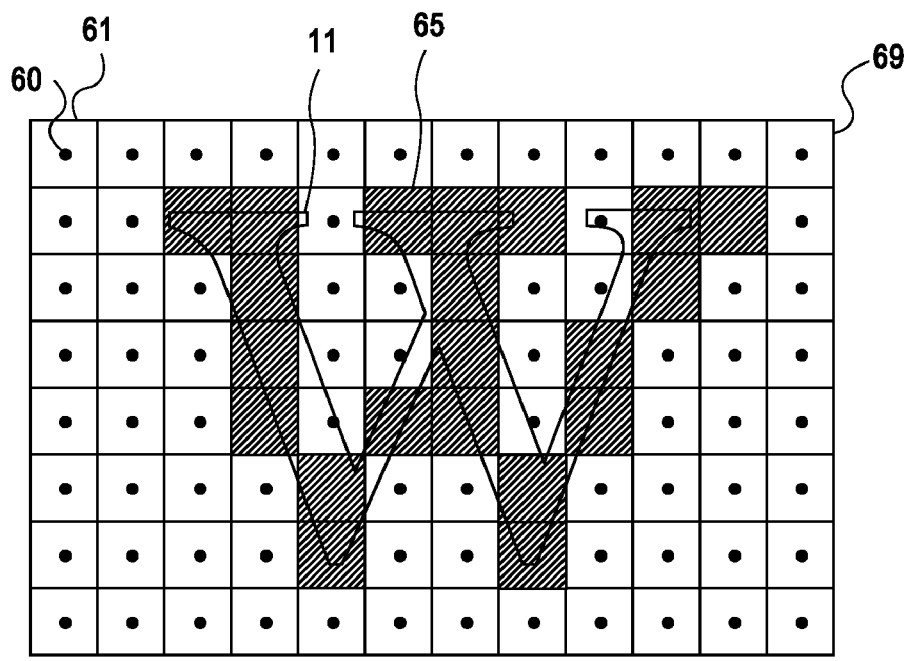
FIG. 5B shows the outline of an idealized "w" character superimposed on the conventional data set of FIG. 5A with a conventional rendering of the "w."

FIG. 5B shows the data set 69 of FIG. 5A with sample points 60 and associated implied sample areas 61 along with the idealized "w" character 11 to be rendered. As is shown in FIG. 5B, the outline "w" 11 may not perfectly match the boundaries of the implied sample areas 61. In cases such as these, it is known in the art to choose the closest sample points that lie within or near the outline and set the data to extreme values, (e.g., black and white) to render the character as an approximation with very high contrast.

As shown, this yields the approximate "w" 65. FIG. 5B, as well as FIGS. 6A, 6B, and 6C, and the small representation in FIG. 7, all show the approximate "w" 65 with the illustrated shading pattern in each implied sample area. To subpixel render the data set 69 of FIG. 5B, the resample planes of FIGS. 4A, 4B, and 4C are overlaid upon the data set 69 of FIG. 5B, as shown in FIGS. 6A, 6B, and 6C, respectively.

Figure 8:
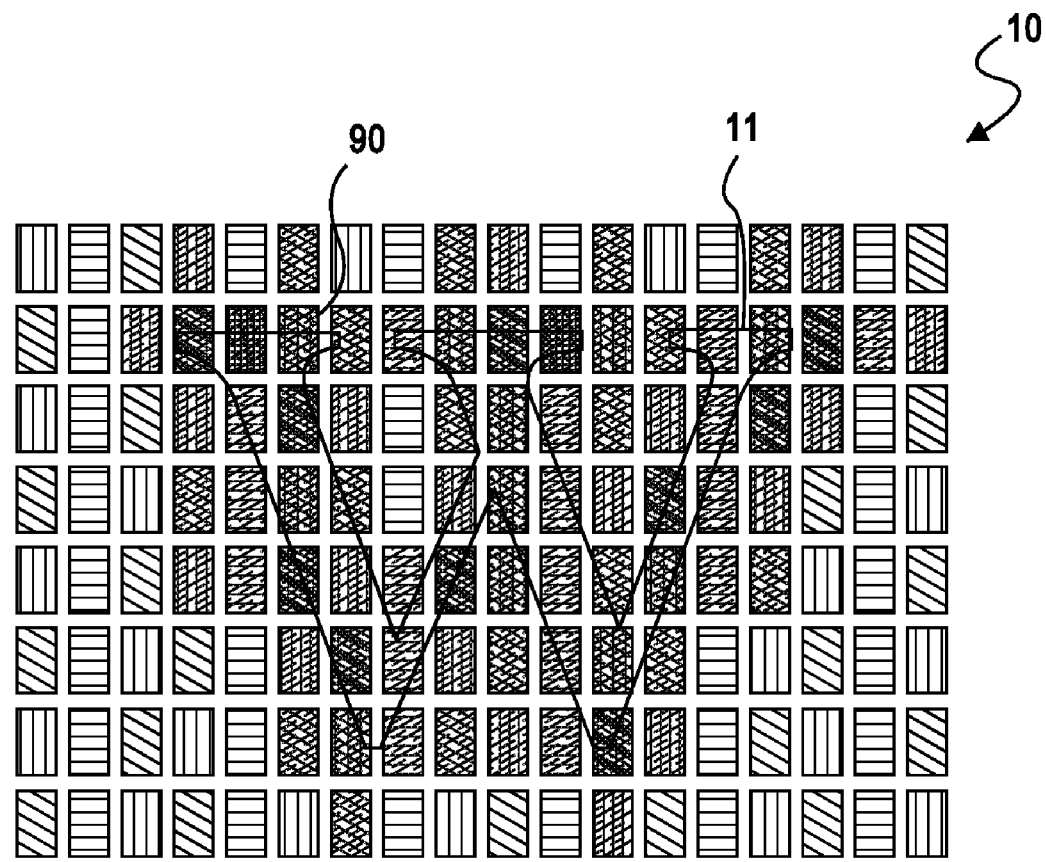
FIG. 8 shows the display of FIG. 1 with the resulting subpixel rendered image produced by the resample operation of FIGS. 6A, 6B, and 6C of the conventionally rendered "w." The outline of an idealized "w" character is superimposed for comparison.

Referring to FIG. 6A, the approximate "w" 65 image is resampled, by each red reconstruction point 44 and its associated resample area 45. The fractional overlap of each input sample area 61 and resample area 45 generates a coefficient of a filter kernel. For each red resample area 45 that overlaps an implied input sample area 61, the data for the red value of the associated input sample point 60 is multiplied by the associated filter kernel coefficient, then summed with the rest of the results of the rest of the resampled data. This is used as the output value, potentially modified by other means or mechanisms, as was described in several of the above-referenced and commonly owned applications, to a suitable electronic color display, such as that shown in FIG. 7. As is shown in FIG. 6A, some resample areas 45 overlap input sample areas 61 that are part of the black "w" 65 as well as some other input sample areas that are not part of the "w" 65, which may be a background color, typically white. This will result in a 'grey' value as the output to the display. The results of resample operations of FIGS. 6A, 6B, and 6C and subsequent display are shown in FIG. 8. The outline of the idealized "w" 11 is shown for comparison. It should be noted that, due to the resample of the crude approximation of the "w" 65, the resulting image 90 shown in FIGS. 7 and 8 has an 'out-of-focus' or fuzzy quality.

Figure 11:
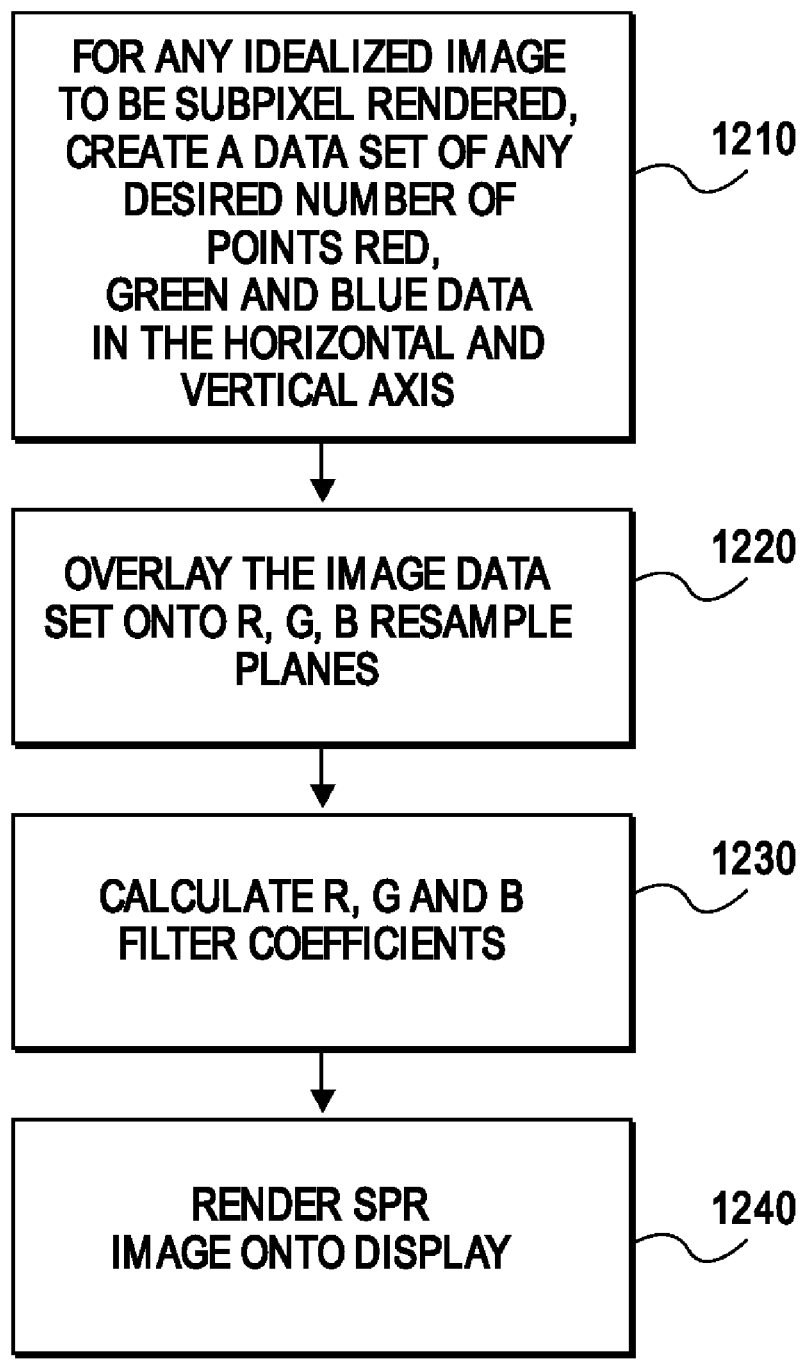
FIG. 11 is a flowchart of one embodiment of subpixel rendering an idealized image from a coincident image data set.

FIG. 11 illustrates a flowchart summarizing this embodiment of subpixel rendering idealized images onto a display having colored subpixels. Initially, for any idealized image to be subpixel rendered, an image data set is created of coincident red, green and blue data points that approximates the idealized image for any desired number of such coincident points in the horizontal and vertical axis (step 1210). This image data set is overlaid onto red, green and blue resample planes (step 1220). The filter coefficients are calculated for each given colored subpixel according to a suitable formula—e.g., as disclosed in many of the above-referenced and commonly owned applications (step 1230). Finally, the subpixel rendered image is displayed onto the display ( step 1240).

One method of improving the image quality of the image is to create a higher resolution approximation. For instance, referring to FIG. 9, the resolution of the image data set 109 shown is twice that of 69, that is to say, that in each axis there are twice as many sample points 100 and associated implied sample areas 101 as there were sample points 60 and associated implied sample areas 61 for the same over all data set. The outline of the idealized "w" character 11 is shown superimposed on the data set. As before, an approximation of the "w" 105 is created. Note that the approximation 105 of FIG. 9 is closer to the ideal than the approximation 65 of FIG. 5B.

Figure 9:
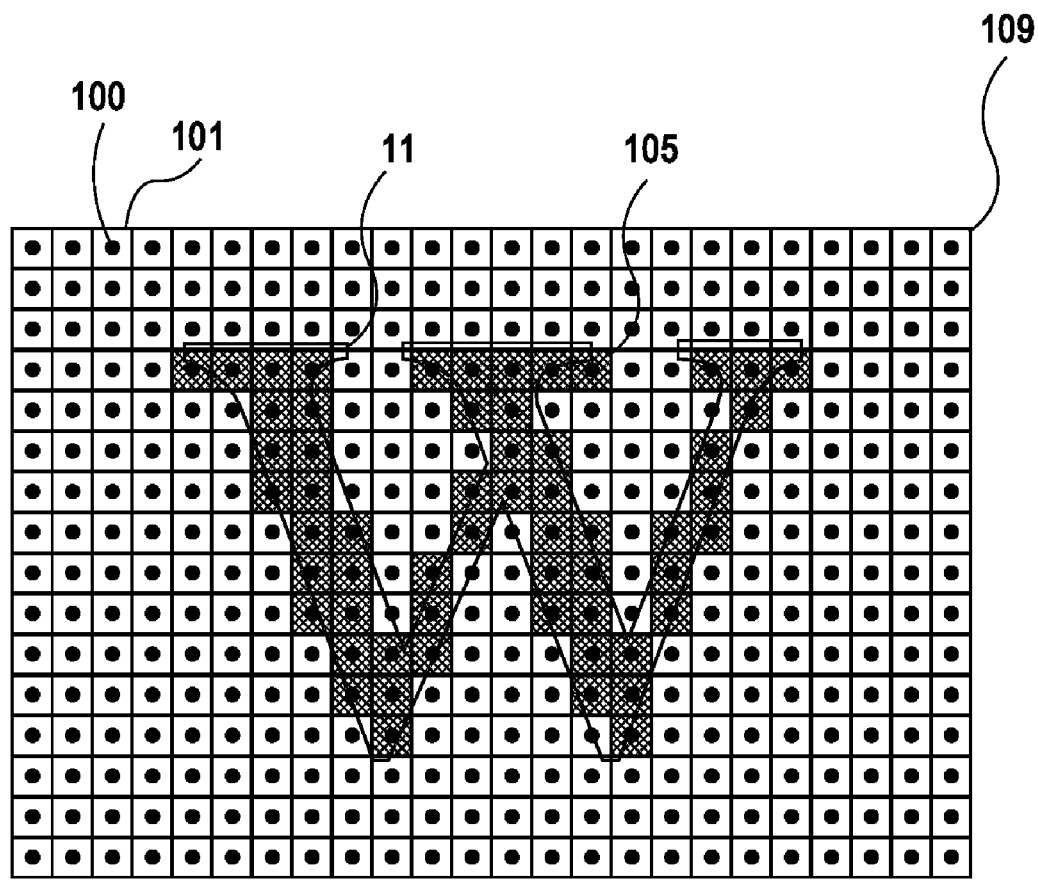
FIG. 9 shows the outline of an idealized "w" character superimposed on a higher resolution conventional data set with a conventionally rendered "w."
Figure 10A:
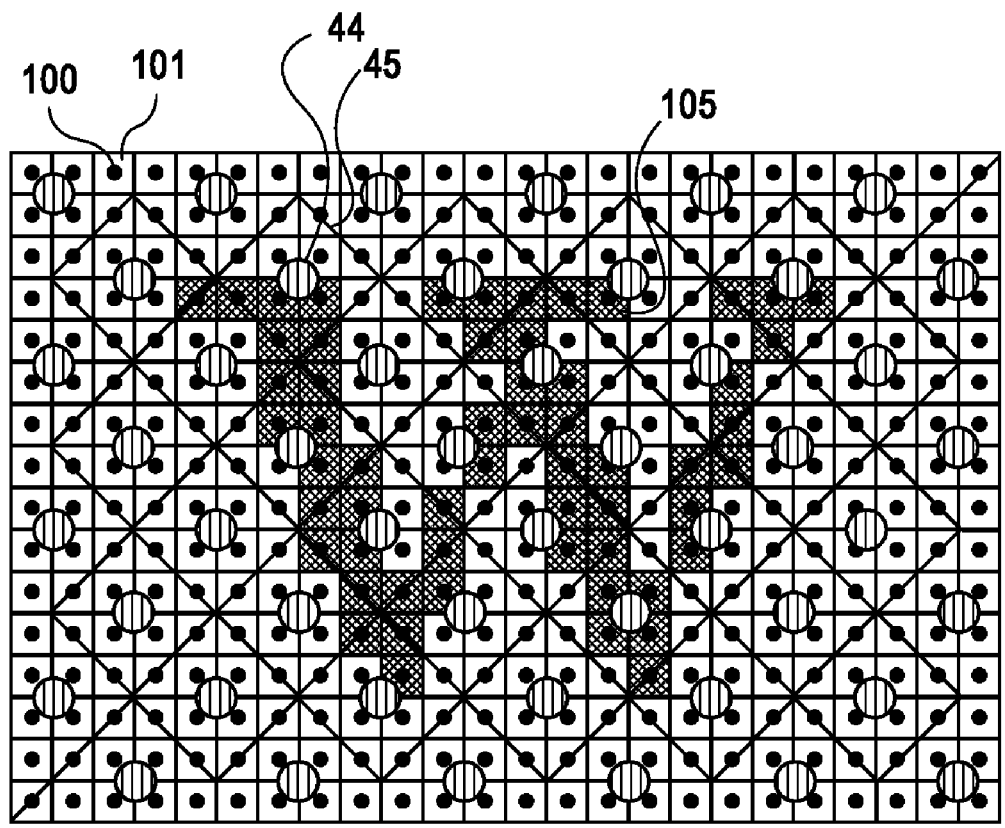
FIGS. 10A, 10B, and 10C show the red, green, and blue resample planes of FIGS. 4A, 4B, and 4C, respectively, overlaid onto data set of FIG. 9 with the rendered "w."
Figure 10B:
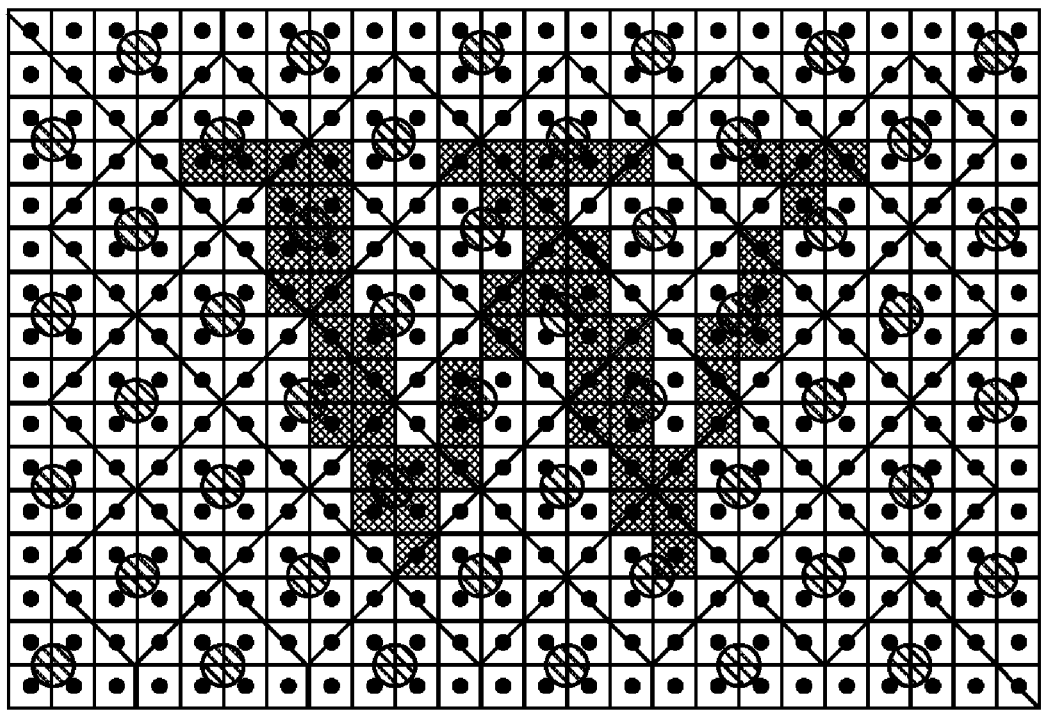
Figure 10C:
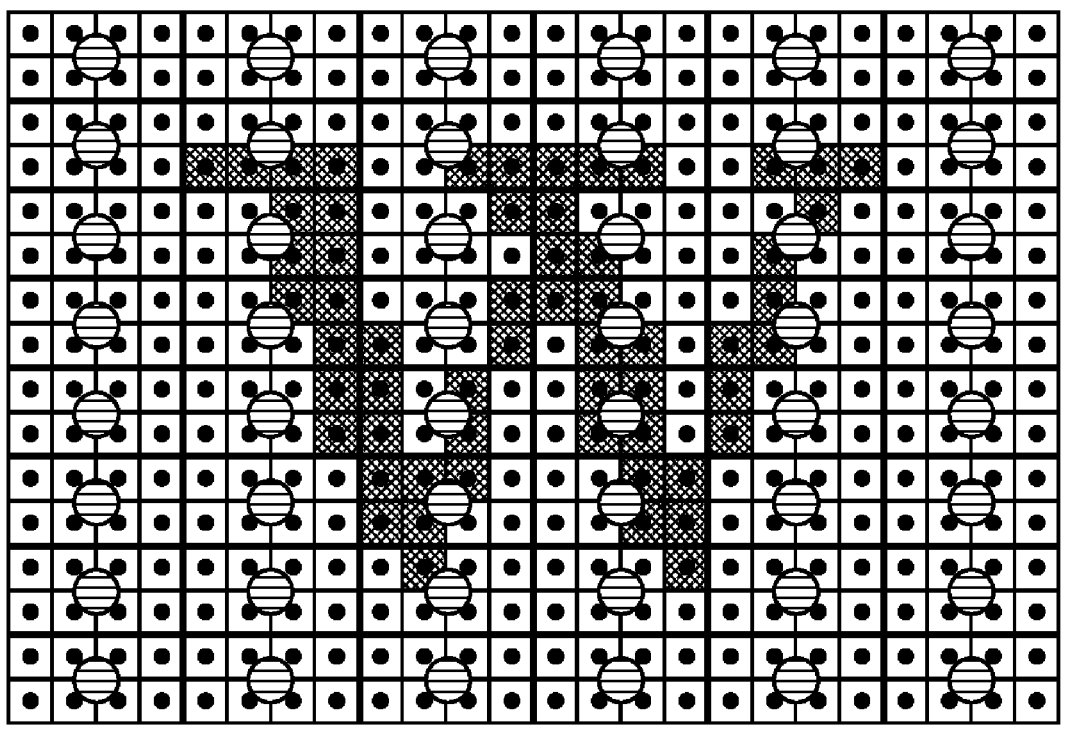

To subpixel render the data set 109 of FIG. 9, the resample planes of FIGS. 4A, 4B, and 4C are overlaid the data set 109 of FIG. 9, as shown in FIGS. 10A, 10B, and 10C, respectively. Referring to FIG. 10A, the approximate "w" 105 image is resampled, by each red reconstruction point 44 and its associated resample area 45. The fractional overlap of each input sample area 101 and resample area 45 generates a coefficient of a filter kernel. For each red resample area 45 that overlaps an implied input sample area 101, the data for the red value of the associated input sample point 100 is multiplied by the associated filter kernel coefficient, as shown below:

$$\begin{matrix} 0 & 1 & 1 & 0 \\ 1 & 2 & 2 & 1 \\ 1 & 2 & 2 & 1 \\ 0 & 1 & 1 & 0 \end{matrix} \text{ or, for sharper images } \begin{matrix} -1 & 1 & 1 & -1 \\ 1 & 3 & 3 & 1 \\ 1 & 3 & 3 & 1 \\ -1 & 1 & 1 & -1 \end{matrix}$$

then summed with the rest of the results of the rest of the resampled data. This is used as the output value, potentially modified by other algorithm stages, as was described in several of the above-referenced and commonly owned applications, to a suitable electronic color display, such as that shown in FIG. 7.

Figure 12:
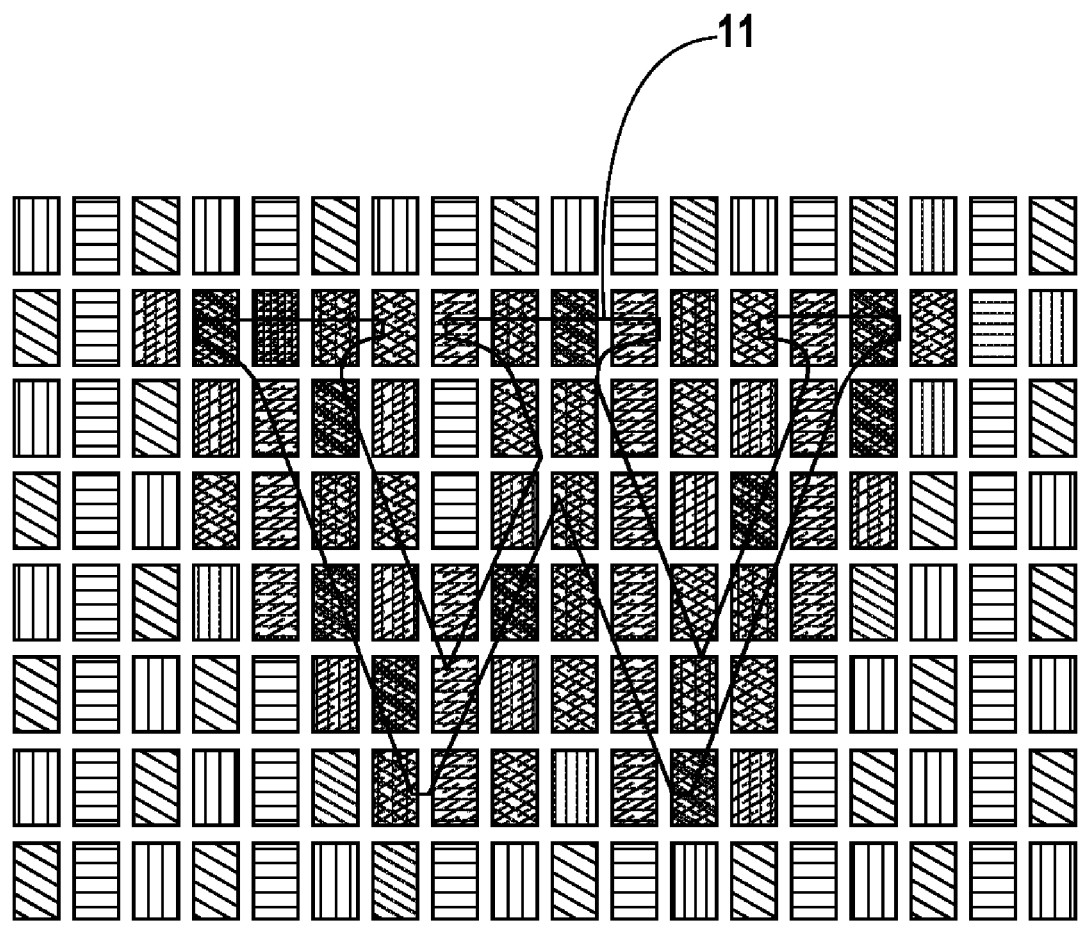
FIG. 12 shows the display of FIG. 1 with the resulting subpixel rendered image produced by the resample operation of FIGS. 10A, 10B, and 10C of the conventionally rendered "w." The outline of an idealized "w" character is superimposed for comparison.

Following the same methods as described with respect to FIG. 11, some resample areas overlap both (1) input sample areas 101 that are part of the black "w" 105; and (2) input sample areas 101 that are not part of the "w" 105, which may be a background color, typically white. This will result in a 'grey' value as the output to the display. The results of resample operations of FIGS. 10A, 10B, and 10C and subsequent display are shown in FIG. 12. The outline of the idealized "w" 11 is shown for comparison. Due to the resample of the closer approximation of the "w" 105, the resulting image shown in FIG. 12, while still having an 'out-of-focus' quality, is better than the image of FIG. 8. This procedure could be repeated as mentioned above by increasing the number of image data points in the horizontal and vertical axis to any degree desired and the method of FIG. 11 could then be applied. Thus, the image quality may be further increased by further improvement to the approximation of the ideal character. However, diminishing returns are very likely to result.

Another method, that avoids an approximation and gives result very much like having an infinite resolution approximation, is to directly sample the idealized outline of the character, or other image desired—with the subpixel rendering resample areas of the target display, skipping the intermediate approximation on a conventional data set. To directly subpixel render the idealized character "w" 11, the outline of the idealized "w" 11 is overlaid onto the resample planes of FIGS. 4A, 4B, and 4C, as shown in FIGS. 14A, 14B, and 14C, respectively.

Figure 14A:
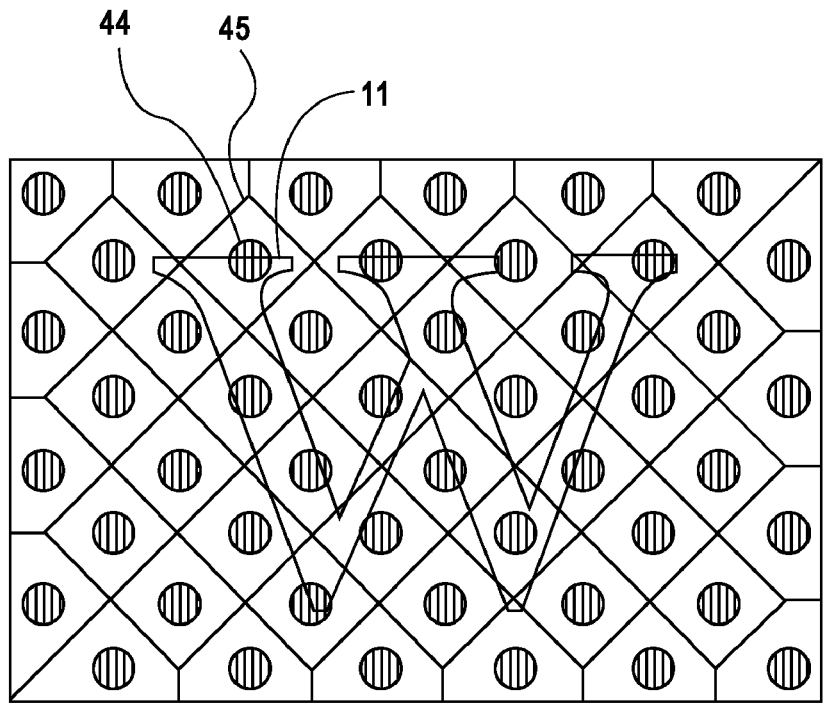
FIGS. 14A, 14B, and 14C show the red, green, and blue sample planes of FIGS. 4A, 4B, and 4C, respectively, overlaid onto the outline of an idealized "w" character.

Referring to FIG. 14A, the idealized "w" 11 image is sampled, by each red reconstruction point 44 and its associated resample area 45. The fractional overlap of each portion of the "w" 11 and resample area 45 generates a coefficient of a filter kernel. For each red sample area 45 that overlaps a character 11 area, the data for the red value of the character is multiplied by the fractional overlap, then summed with the rest of the results of the rest of the sampled data. This is used as the output value, potentially modified by other algorithm stages as was described in several patent applications mentioned above, to a suitable electronic color display, such as that of FIG. 1. Assuming that the character "w" 11 is black, some resample areas overlap input image areas that are part of the black "w" 11 and input image areas that are not part of the "w" 11, which may be a background color, typically white. This will result in a 'grey' value as the output to the display.

Figure 14B:
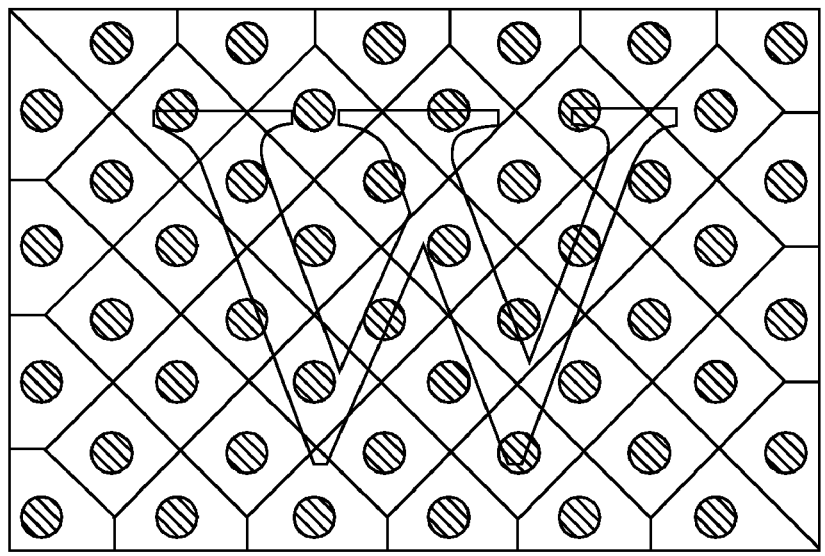
Figure 14C:
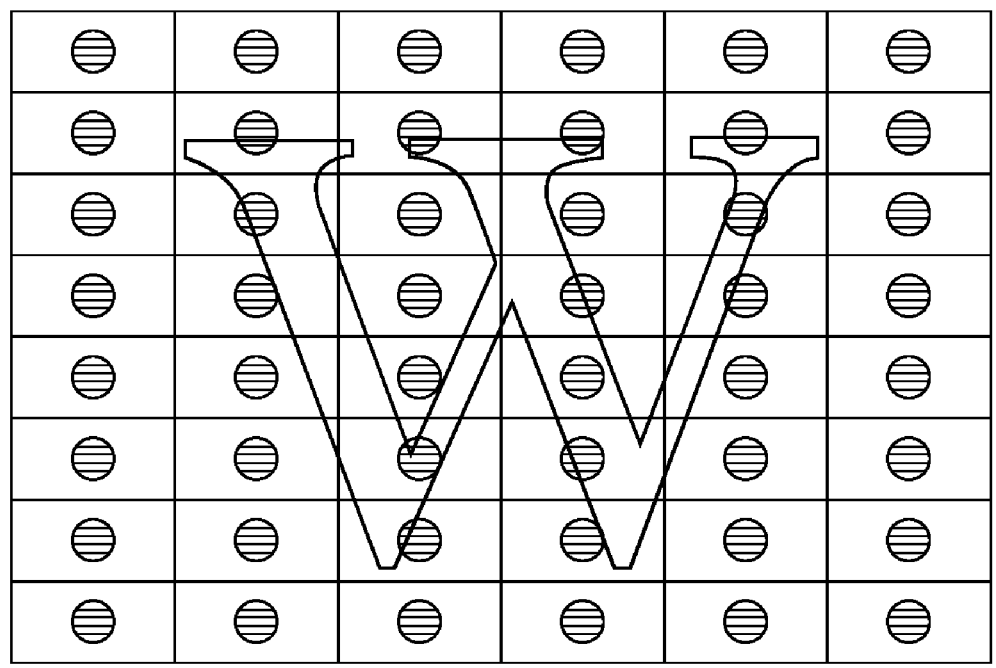
Figure 15:
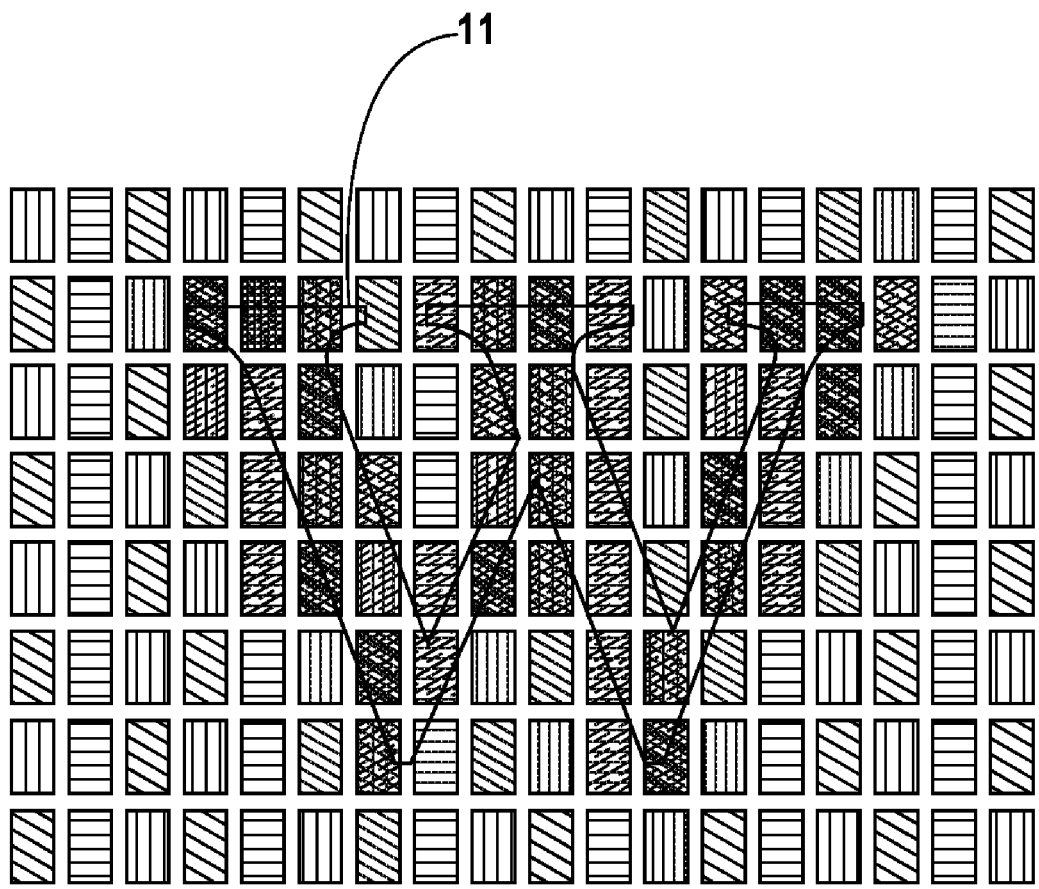
FIG. 15 shows the display of FIG. 1 with the resulting subpixel rendered image produced by the direct sample operation of FIGS. 14A, 14B, and 14C of the idealized "w" character. The outline of the idealized "w" character is superimposed for comparison.

The results of resample operations of FIGS. 14A, 14B, and 14C and subsequent display are shown in FIG. 15. The outline of the idealized "w" 11 is shown for comparison. Due to the area sampling the "w" 11, the resulting image shown in FIG. 15, while still having a very slight 'out-of-focus' quality, is better than the images of FIGS. 8 and 12, and may even be better than the approximation of FIG. 5B.

Figure 13:
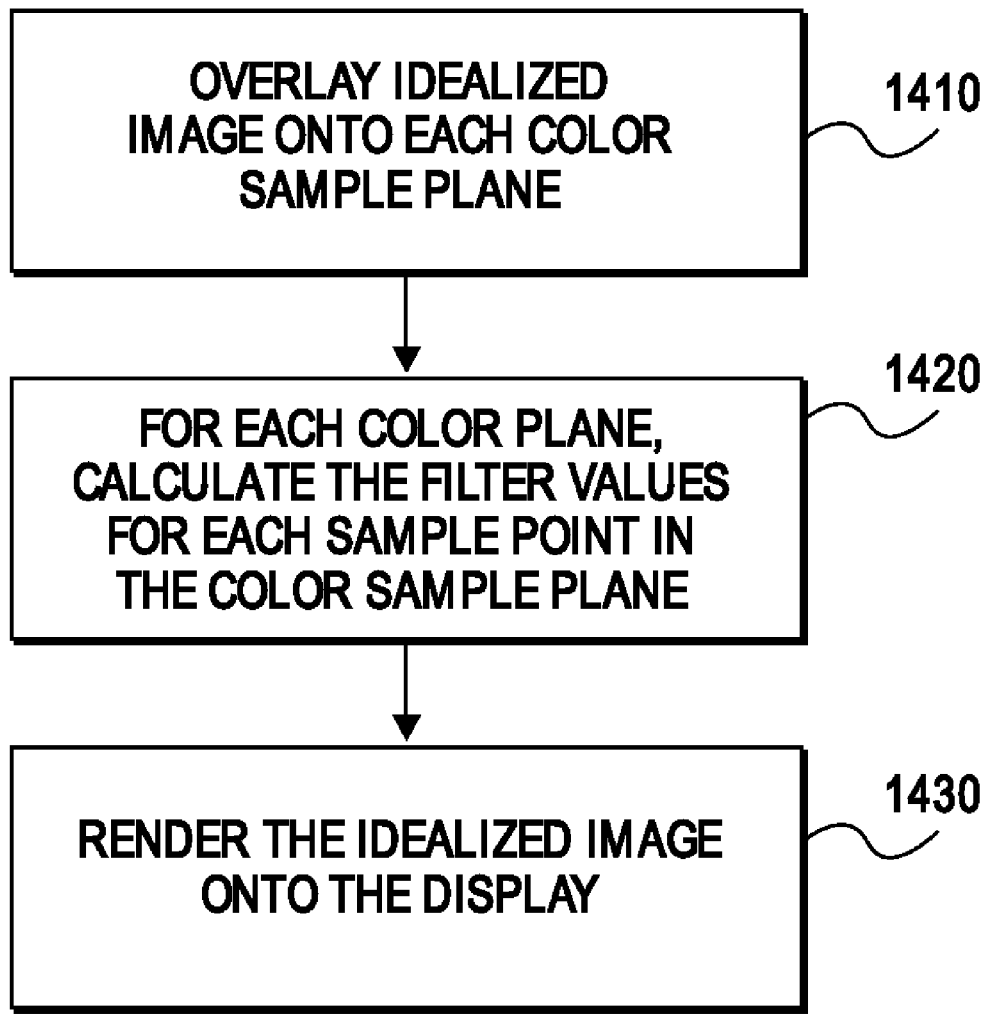
FIG. 13 is a flowchart of one embodiment of directly subpixel rendering an idealized image onto colored subpixel sample planes.

FIG. 13 summarizes the method of directly subpixel rendering an idealized image. Initially, the idealized image is overlaid onto each color sample plane (step 1410). For each such color sample plane, filter values (e.g., kernels or coefficients) are calculated for each sample point in the color sample plane, according to any suitable method for calculating such filter values such as kernels or coefficients (step 1420). The filter values are used to obtain a dot matrix product of the idealized image color values for each coefficient. The result of the dot matrix product can be stored as a pre-subpixel rendered image. The idealized image can also be rendered onto the display (step 1430). Furthermore, the calculated filter values may be stored for later use, retrieval, and transmission for later rendering of the idealized image. In particular, the sample filter values (kernels or coefficients) can be used to describe an idealized image at a specific scale instead of using the shape of the idealized image. Thus, using stored sample filter values, different colored text can be rendered against different colored backgrounds.

The concept of directly sampling an image or graphic data set, with suitable offset sample areas matching the expected reconstruction points for a known subpixel architecture can be extended to other methods of sampling known in the art, but previously limited to the non-offset, fully converged red, green, and blue sampling for the conventional data set (previously described in connection with FIG. 5A). For example, in ray trace rendering of complex three dimensional (3D) graphics models of an artificial scene, it is common to partially sample, or stochastically (randomly) partially sample, a super sampled image to save processing time. These methods may be easily modified to use offset samples that match a given subpixel arrangement to directly create a subpixel rendered data set.

Encoded Pre-Subpixel Rendered Data Into a Image Data Stream

While subpixel rendering of an image may be processed and immediately displayed in the manner that was described in FIG. 7, it is sometimes desirable to store the image after subpixel rendering for later display. If instead of a direct second data path 85, a storage and or transmission means may be inserted between the subpixel rendering means 70 and the electronic display 10. Storage and transmission of an image after the subpixel rendering operation has advantages over storage and transmission of a conventional data set and then performing the desired subpixel rendering routine. For example, the subpixel rendered data set may require half, or even less, than the storage space and/or transmission bandwidth of the conventional image data set that generated it. The subpixel rendered data set thus created, stored, and/or transmitted is defined as a "pre-subpixel rendered image."

Another advantage to storage and transmission of pre-subpixel rendered images may be that the display device may be made less expensive by not including a means for subpixel rendering of image data sets. For example, a plurality of devices, of which there are many in use in a distributed system, may receive images that have been pre-subpixel rendered from a single source. Such a device and system may comprise a broadcast television system with one transmitter and many receivers. Another device may be a single computer or video player in a home, with one or more remote electronic display devices receiving transmitted pre-subpixel rendered images. Other systems will readily come to mind to those proficient in the art.

Figure 16A:
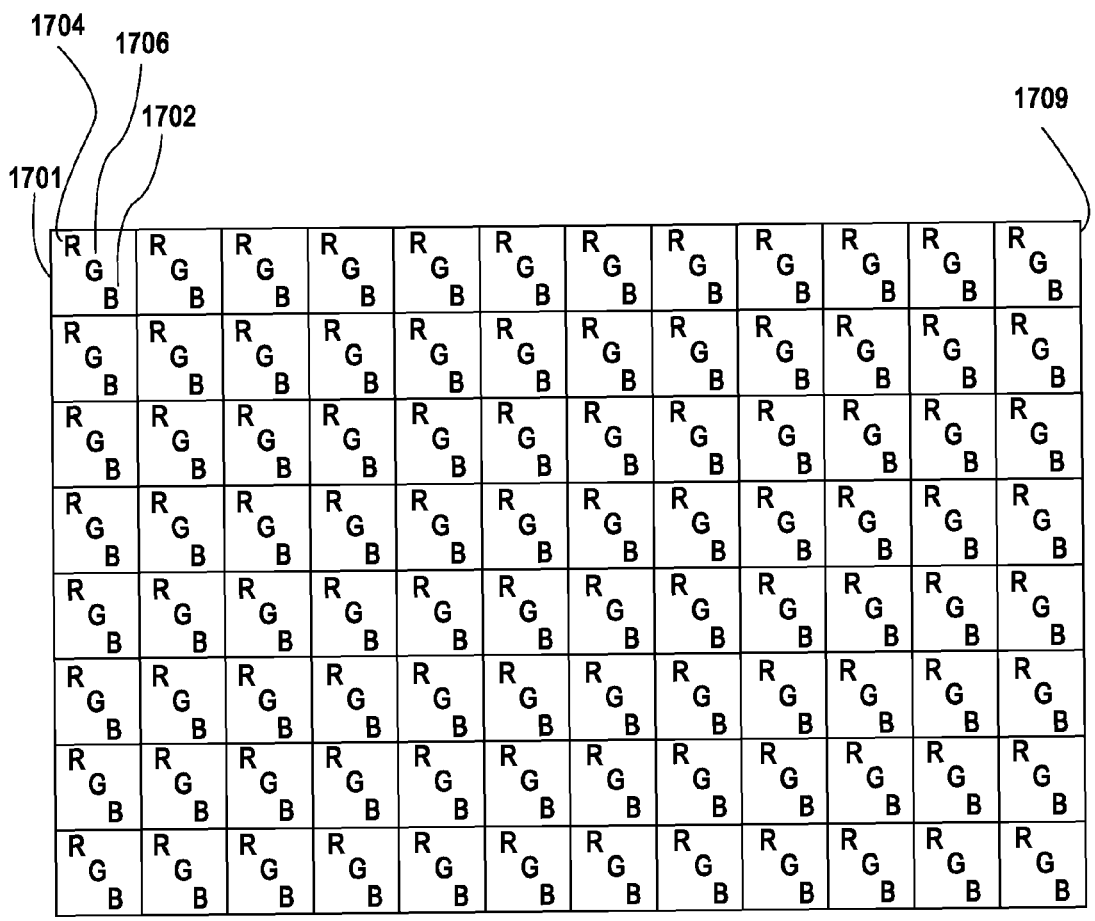
FIG. 16A shows a representation of a conventional data set with one red, green, and blue sample per square sample area.

Examining the process of creating a pre-subpixel rendered image data set, reference to a conventional data set, such as represented in FIG. 16A, is explained. A conventional image data set 1709 represents a red 1704, green 1706, and blue data value 1702 per implied sample area 1701. Filter kernels are generated by the overlaps of sample and resample areas, as described earlier in connection with FIGS. 6A, 6B, and 6C, to calculate a matrix dot product of the conventional data set and the filter kernels to produce a new data set 1719, as shown in FIG. 16B, with new red 1714, green 1716, and blue 1712 data points.

Figure 16B:
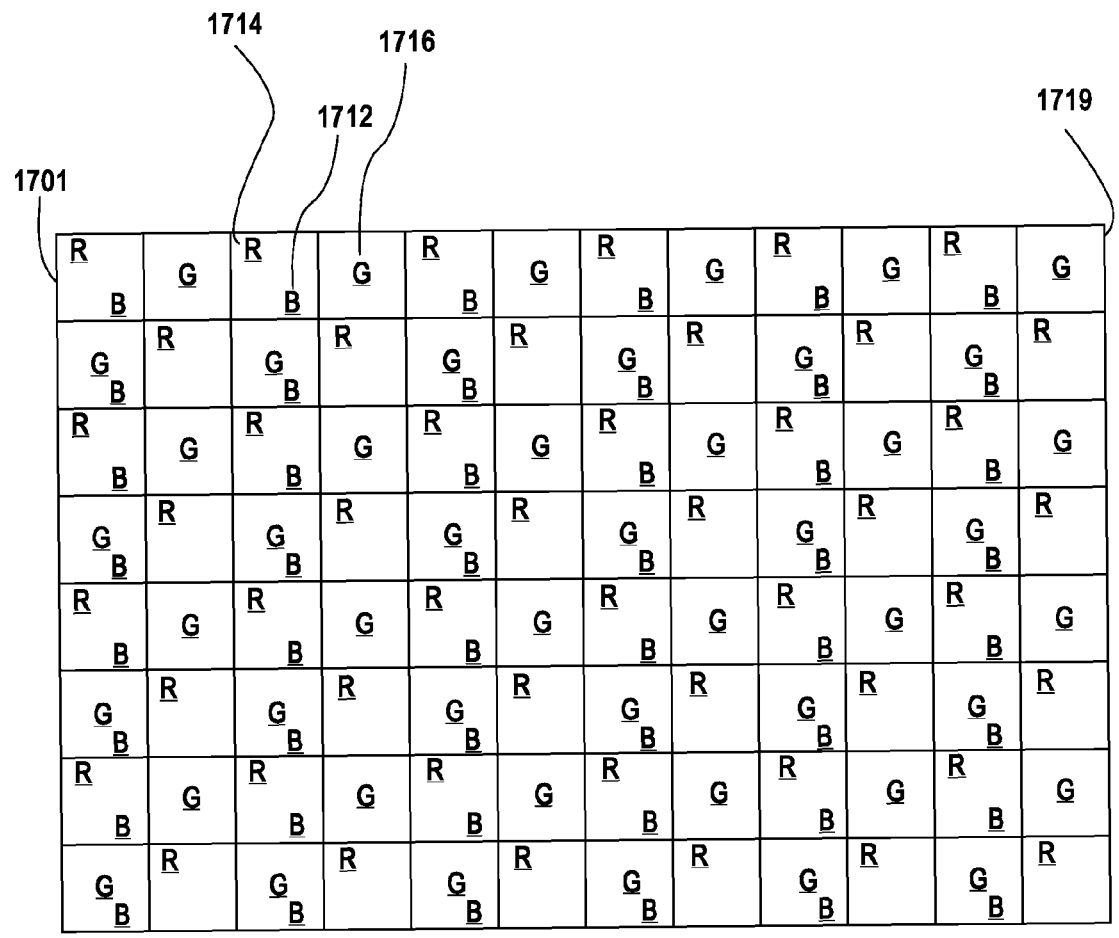
FIG. 16B shows a representation of a data set with "missing" samples that have been decimated (thrown away) by the process of subpixel rendering, leaving the resampled, subpixel rendered data set.

FIG. 16B illustrates the relative positions that this data set 1719 maps to the original data set 1709. Note that there are "missing points" from the original data set 1709. The new data set 1719 may be passed directly via the second data path 85 of FIG. 7, to the electronic display. Alternatively, it may be stored as a pre-subpixel rendered image for later delivery to an electronic display in a suitable medium 71, possibly associated with the subpixel rendering means 70 as shown in FIG. 7.

Figure 16C:
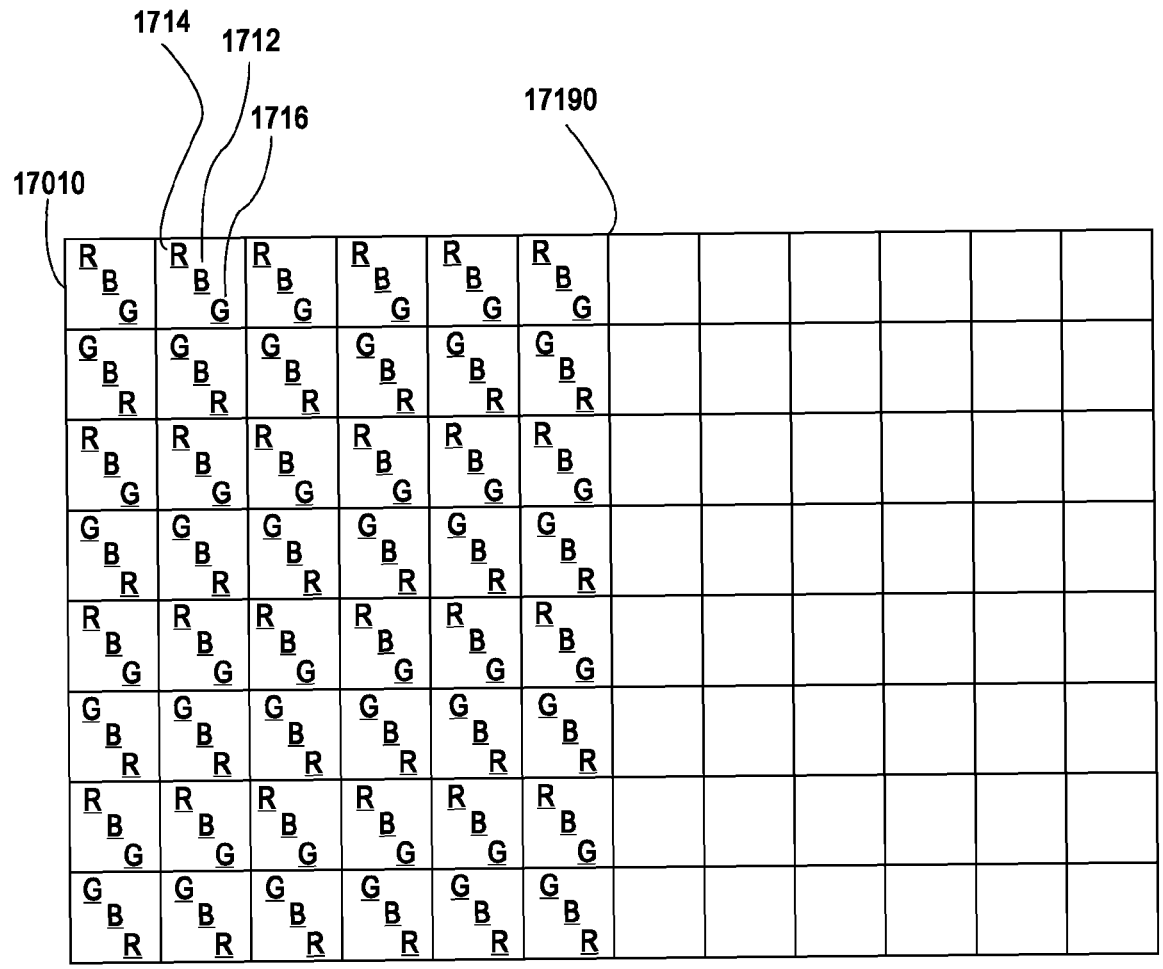
FIG. 16C shows the subpixel rendered data set of FIG. 16B, compacted as three samples, red, green, and blue, per "conventional" data set sample area, but still in the column driver subpixel rendered data set order.

FIG. 16C illustrates how the subpixel rendered data set 1719 may be compacted into a smaller, compact data set 17190 that mimics the conventional data set format to the extent that it has three samples, a red 1714, green 1716, and blue 1714 sample, per "conventional pixel" 17010, but uses a sample order allowing direct distribution to the column drivers of an electronic display device such as that of FIG. 1. It should be noted that the subpixel rendered data set 17190 uses half of the memory storage as the conventional data set 1709, yet represents the same image when shown on an electronic display such as that of FIG. 1. When an electronic display such as that of FIG. 1 receives the pre-subpixel rendered data set 17190, it may display it directly, with no further processing required.

Image compression techniques that do not absolutely require knowledge of the color component identity, but losslessly compress digital data, may be applied to the column driver ordered pre-subpixel rendered data set 17190 of FIG. 16C. For example, color indexing compression schemes such as ".PNG" and Graphics Interchange Format (".GIF") do not need to 'know' the color component assignment, they just note that there are often limited numbers of data values per conventional "pixel" 17010, and index them for image compression. Upon decompression, the original column driver ordered pre-subpixel rendered data set 17190 is restored, unchanged.

Figure 16D:
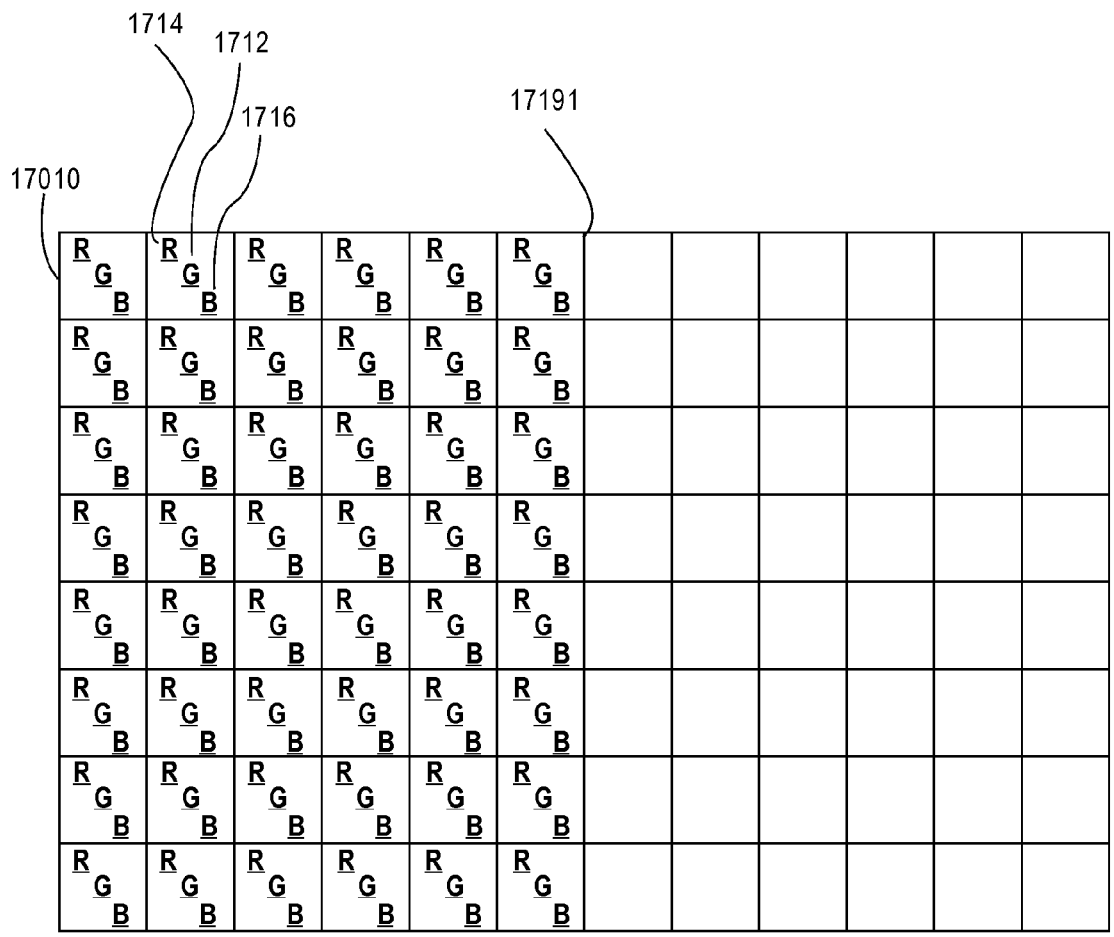
FIG. 16D shows the compacted subpixel rendered data set of FIG. 16C, reordered within each "conventional" data set "pixel" to conform to the conventional data set format order.

In some circumstances it may be desirable to have the pre-subpixel rendered data set more closely mimic the conventional data set by using the color sample data order in each "pixel" 17010. Referring to FIG. 16D, the color sample data of each "pixel" 17010 is in the conventional data set order of red, green, blue. The data samples for each "pixel" 17010 of the data set 17191 is identical to that of the corresponding "pixel" 17010 of the column driver ordered data set 17190 of FIG. 16C. Using the conventional order allows the pre-subpixel rendered data set to be further processed by some algorithms used on conventional data sets that require knowing which color component each sample location maps to.

For example, compression algorithms that use transforms within each color component, such as Discrete Cosine Transform (DCT) used in JPEG image compression, or Wavelet Transform used in JPEG2000 image compression, require this knowledge. Format conversion to other color spaces, such as those that separate the luminance and chrominance components, $YC_BC_R$, may also require this conventional color sample order. Though it may be best to force the compression algorithm not to subsample the chrominance components, since in pre-subpixel rendering the image, much of the luminance information has been transferred into what would appear to be the chrominance channel. The conventionally ordered pre-subpixel rendered data set 17191 of FIG. 16D may then be compressed or converted, stored and/or transmitted, received and/or retrieved, decompressed or reconverted back to conventionally ordered RGB color space, then finally reordered back to the column ordered pre-subpixel rendered data set 17190 of FIG. 16C to be displayed on an electronic display 10 such as that of FIG. 1.

Figure 20:
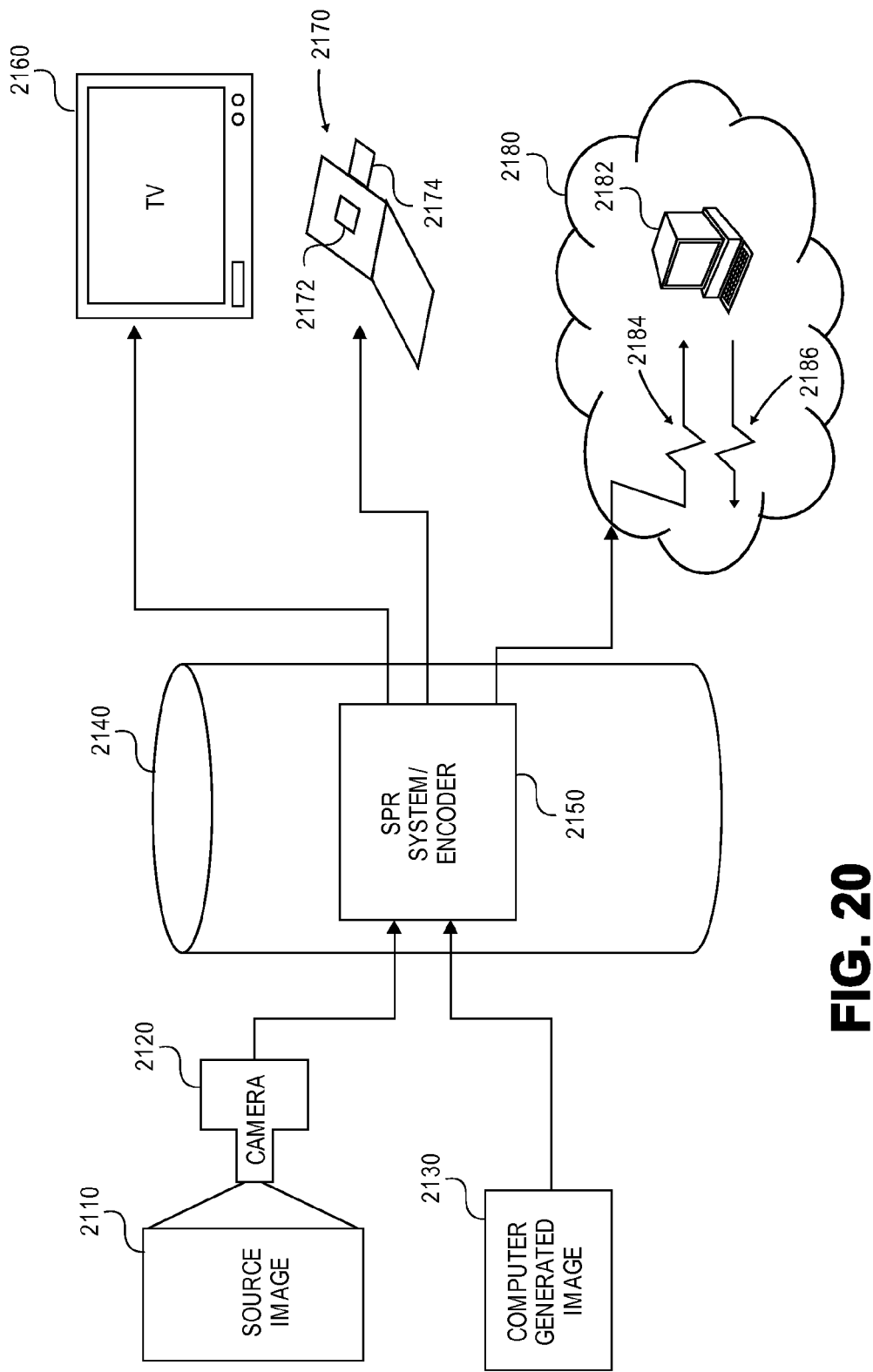
FIG. 20 depicts a pre-subpixel rendering system that may input image source data from multiple sources and might output subpixel rendered data to numerous clients via multiple paths.

FIG. 20 depicts multiple uses and systems that might incorporate a pre-subpixel rendering system or algorithm—and outputting to one or many possible different clients. In one possible embodiment, a subpixel rendering system/encoder could be used as part of a head-end 2140 that may input one or many sources of image data—e.g. source image 2110 captured by a camera 2120 or a completely computer generated image 2130 or a combination of both. Camera 2120 could include an analog recording medium or a digital recording medium. If camera 2120 employs a digital encoding medium, then the entire system might be optimized by choosing a subpixel repeat arrangement for the imaging portion of the camera that would substantially match the subpixel arrangement of the display device (e.g. TV, monitor, cell phone, etc) to receive its image data stream.

Head end 2140 would receive the source input image data and perform the subpixel rendering routines as noted herein or in any of the above-referenced and commonly owned applications. Once the source image data is so rendered, then the head end 2140 could output this data to any number of destination displays over a number of destination communications media—FIG. 20 is merely representative of some of these uses and is not meant to be exhaustive. For example (and as explained in greater detail below), the output subpixel rendered data could be sent to TVs 2160 via wireless or cable media; cell phones (or phones) 2170 having a display 2172 and possibly its own camera 2174 (in which case, phone 2170 could be a source of image information to be subpixel rendered back at the phone or at the head end); or a web browser running on a computer 2182 via the Internet 2180 (or other network connection) with communication paths 2184 and 2186 as further described below.

One example of a system that may be readily improved using pre-subpixel rendered images is Internet document retrieval and display, commonly known as a "web browser". Web browsers usually report to the web server certain information about the resolution of the display. Web designers can take advantage of this by serving graphics that match the resolution of the screen. Another feature of browsers is "cookies". With cookies, a web server may place information on the browser that may be read by the server, or another server, to enable server based applications to recognize the individual user of a browser. Browsers may indicate, perhaps via cookies or any other known method, what subpixel structure the user's panel is—where upon, the server delivers a graphic that matches the user's panel. If a cookie so indicates, the server may deliver to the browser a pre-subpixel rendered image for direct display without further subpixel rendering.

In practice, a web 'surfer' may download a website that contains a logo indicating that the site uses subpixel rendering technology and invites the surfer to "tune-up" their display. This links to a website that includes a series of web pages and CGI code that takes the user through a series of questions about the display type and asks them to view test patterns that allow the user, without fully understanding the heuristic process, to determine the display type, architecture, and gamma. From that, a cookie is placed onto the browser. Upon subsequent visits to websites that use pre-subpixel-rendering, the server queries the cookies to decide which graphics to deliver for best visual performance at the lowest bandwidth, reducing the number of Internet packets required to deliver the desired images.

The browser and operating system, then detecting the pre-subpixel rendered images, perhaps by noting a reserved document suffix extension, delivers the pre-subpixel rendered image directly to the display with no further subpixel rendering. The image may be in either column ordered pre-subpixel rendered data set 17190 format of FIG. 16C or that of the conventionally ordered pre-subpixel rendered data set 17191 format of FIG. 16D. The image may be further compressed with a suitable lossless or lossy compression algorithm. The browser would then process the data received, decompressing and reordering, as required for each particular situation. The pre-subpixel rendered data set may be embedded within a convention data set as described further below.

This process is further explained with regards to FIG. 20. A user's web browser operating on computing system 2182 downloads/requests communications with a website through head end 2140 that is capable of embedding pre-subpixel rendered image data into an image data stream. The website may either (1) query for cookies pertaining to information about user's display on computing system 2182; or (2) prompts user through a series of display tests to determine capabilities on computing system 2182. Depending upon the information obtained by the website, if the user's display and/or operating system can detect pre-subpixel rendered image data in the stream (and can effectively process it), then the website sends image data with embedded pre-subpixel rendered data to the user.

Figure 16E:
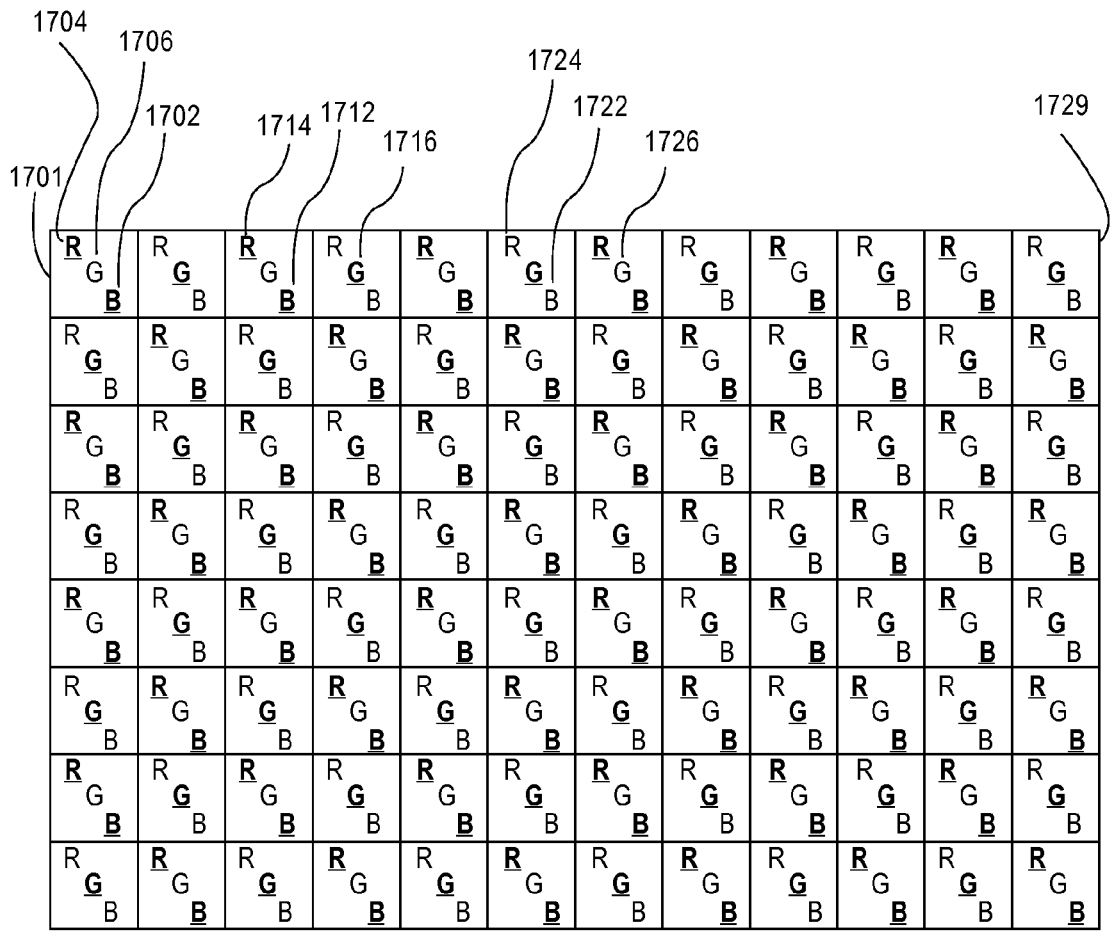
FIG. 16E shows a conventional data set that has two subsets, one or both of which may be a pre-subpixel rendered data set. This may represent the subpixel rendered data set of FIG. 16B replacing the spatially one-to-one mapped samples of FIG. 16A, but retaining the "missing" samples implied in FIG. 16B.

It may be advantageous to embed pre-subpixel rendered images within a conventional image data set. Such conventional image data sets then may be stored and transmitted in a conventional manner by conventional systems, until it reaches a display device that has a means of recognizing the embedded pre-subpixel rendered image and properly extracting and displaying it. One such embodiment is shown in FIG. 16E. A conventionally ordered image data set 1729 represents a red 1704, green 1706, and blue data value 1702 per implied sample area 1701. However, this data set has two data subsets. At least one of the subsets represents pre-subpixel rendered image data. The other data set may represent other information, or it may represent a second pre-subpixel rendered data set. One data set is defined by red 1714, green 1716, and blue 1712 data, here shown in bold and underlined text for convenience. The other data set is defined by red 1724, green 1726, and blue 1722 data, here shown in plain text for convenience. The two data sets have the same form, specifically, one red or green, but not both, per conventional data set group is a member of a data subset. The red and green members of a subset alternate per conventional data set group, mirroring the red/green checkerboard of the subpixel arrangements, e.g., as described in FIGS. 1, 2, and 3 or any of the arrangements described herein.

In one embodiment, two pre-subpixel rendered images may be embedded within a conventional image data set along side each other. These may be pre-subpixel rendered from the same original image, wherein each color point of the conventional data set represents subpixel rendered data for a logical pixel centered at that location. This allows a system with a data extraction decimator to display the images directly on a display panel such as that of FIG. 1, at any point, rather than have to shift the data to the proper color. In another embodiment, the two images may be unrelated, allowing packing of images for greater compression. The images may be two images in a series, such as for video, allowing greater compression. Or they may be stereo-pairs, two images of the same scene, but from different vantage points.

In yet another embodiment, the data set may have one subset that is a subpixel rendered image while the other subset is a subset of the original image. The pre-subpixel rendered image subset replaces the original data in only those positions, while the remainder of the original is unchanged. One use of this aspect of the invention might be for encoding video for television broadcast or video storage such that the images look great on a display panel such as that of FIG. 1, but still look "ok" on a CRT or other panel, e.g. an RGB striped display, using the full conventional data set for backward compatibility.

In one embodiment, the pre-subpixel rendered image will effectively be filtered to limit the high spatial frequencies in the diagonals, to ensure that when displayed directly on a panel, such as that of FIG. 1, no (or minimal) chromatic aliasing occurs. But the full data set 1729, both the subpixel rendered data set and half of the original conventional image, combined will display on a conventional display with very little loss of image quality. This preprocessing would enable low cost television sets that may play pre-subpixel rendered program material, broadcast or recorded, that being pre-subpixel rendered, do not need an expensive subpixel rendering chip. The preprocessing, being done before hand, may be a very sophisticated algorithm, possibly too expensive for local processing in some commercial products, but being done only once at the mastering step, is amortized over the millions of video recordings sold.

The method of creating such a mixed data set 1729 as above may start with a conventional data set 1709 such as represented in FIG. 16A. A conventional image data set 1709 represents a red 1704, green 1706, and blue data value 1702 per implied sample area 1701. We then use the filter kernel generated by the overlaps of sample and resample areas as described earlier in connection with FIGS. 6A, 6B, and 6C to calculate a matrix dot product of the conventional data set and the filter kernel to produce a new data set 1719 as shown in FIG. 16B with new red 1714, green 1716, and blue 1712 data points.

Referring to FIG. 16B, the relative positions that this data set 1719 maps to the original data set 1709. It should be noted that there are "missing points" from the original data set 1709. These missing points are supplied from the original conventional data set 1709. But first, the blue sample point 1712 of every even row is moved to the right by one "pixel" 1701. Then the missing points are filled by mapping the "pixels" 1701 of the subpixel rendered data set 1719 of FIG. 16B to the pixels 1701 of the conventional data set 1709, where upon, any "missing" color point of FIG. 16B is filled with the color sample points from the conventional image data set 1709 of FIG. 16A, to create the filled, mixed data set 1729 of FIG. 16E.

Figure 17A:
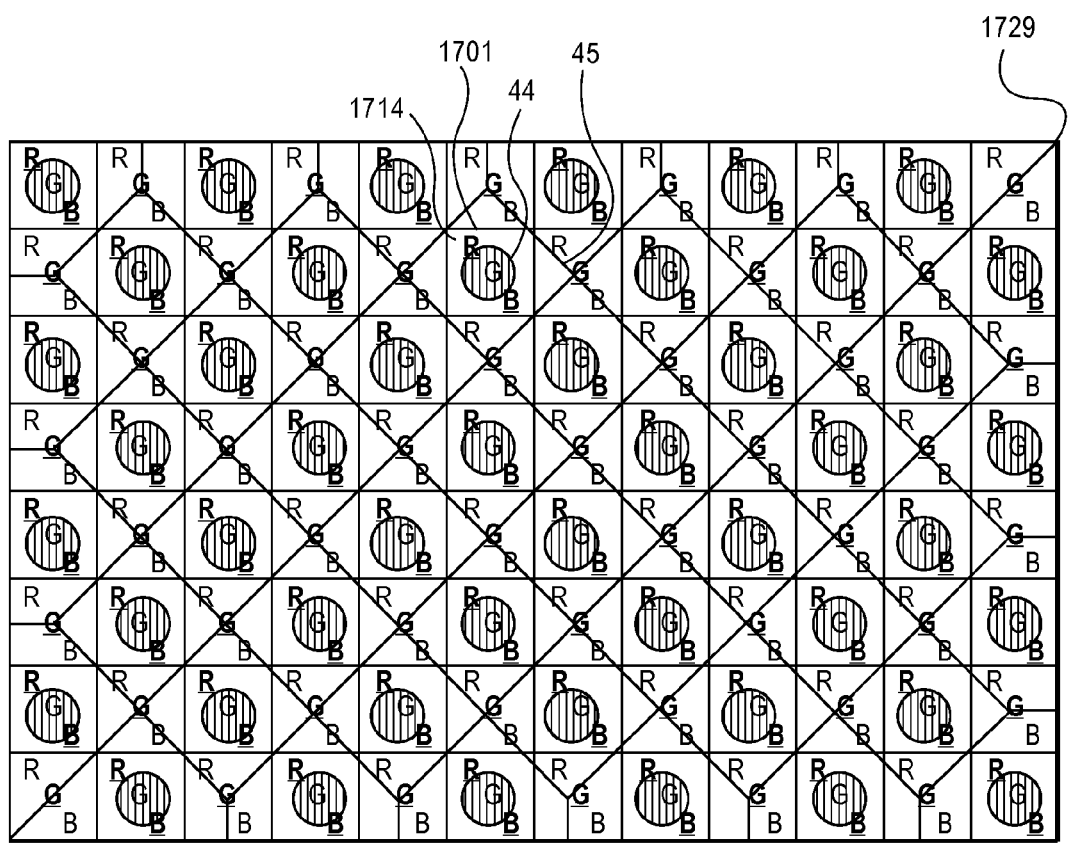
FIGS. 17A, 17B, and 17C show the red, green, and blue resample planes of FIGS. 4A, 4B, and 4C, respectively, overlaid onto data set of FIG. 16E.
Figure 17B:
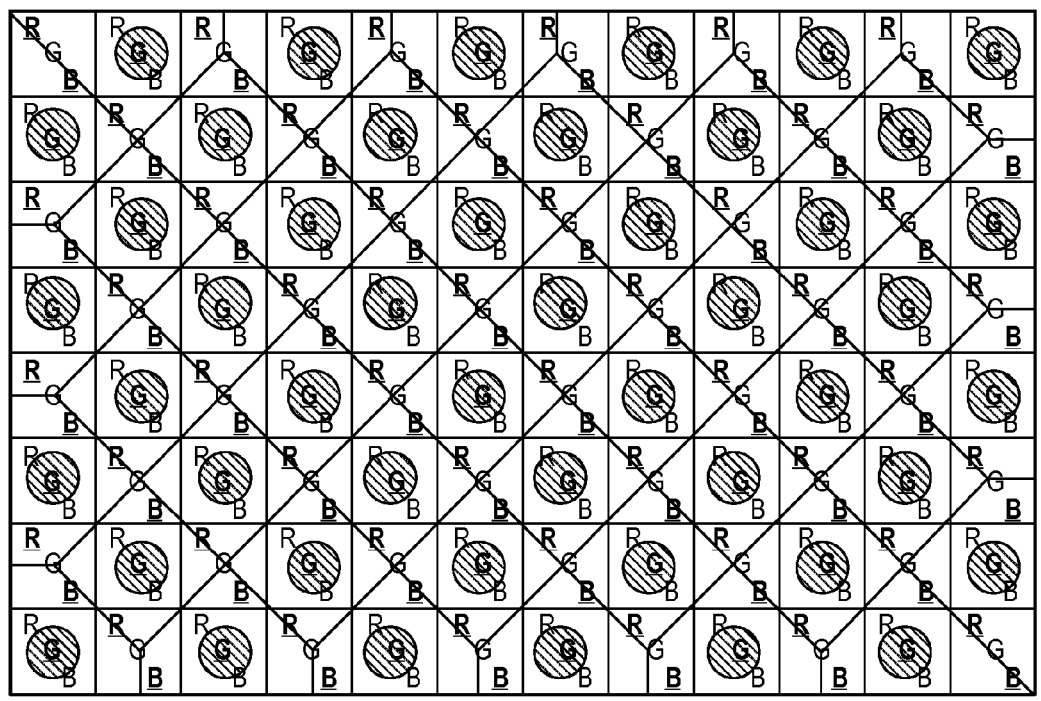
Figure 17C:
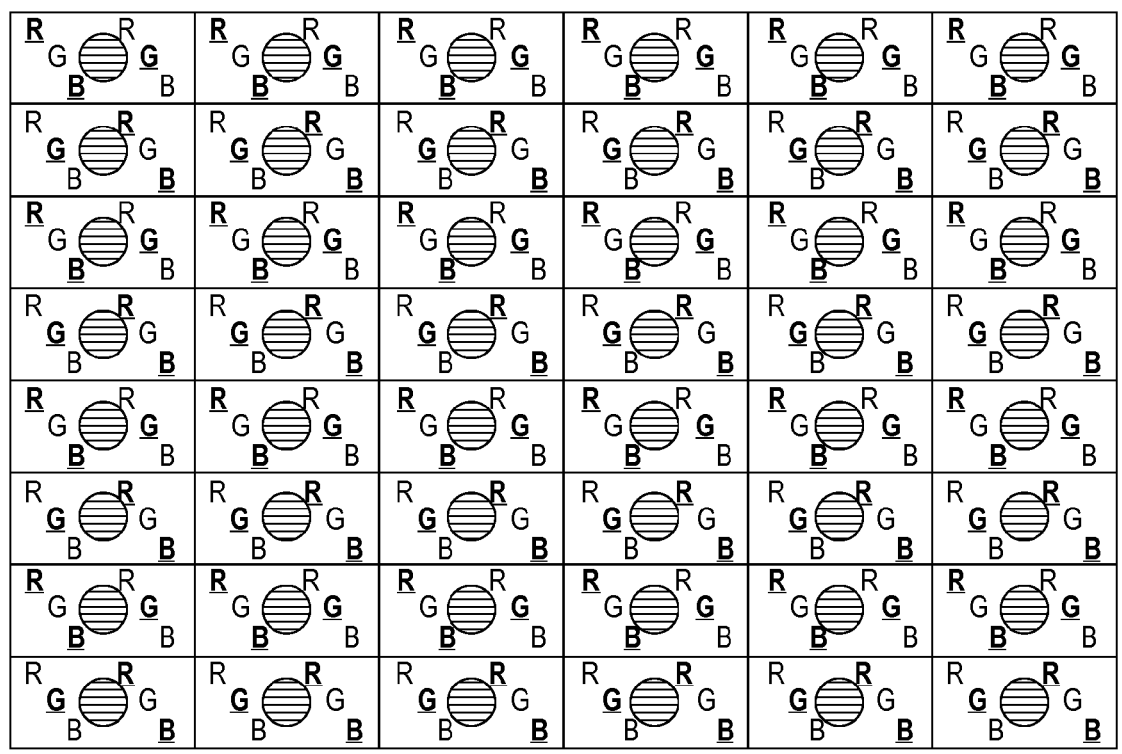

Now it will be disclosed one embodiment for extracting the pre-subpixel rendered data subset 1719 from a conventional image data set format 1729. Referring to FIGS. 17A, 17B, and 17C, the resample planes of FIGS. 4A, 4B, and 4C are overlaid on the data set 1729 of FIG. 16E, respectively. In FIG. 17A, each red resample area 45 completely overlaps one of the implied sample area "pixel" 1701. Knowing that there exists a pre-subpixel rendered data set, the usual subpixel rendering algorithm is suspended in favor of a simple data extraction and decimation in which the red data point 1714 is used as the output value for the associated red reconstruction point 44. All other input data samples are ignored. A similar operation is performed for the green data plane as shown in FIG. 17B and the blue data plane as shown in FIG. 17C.

Figure 21:
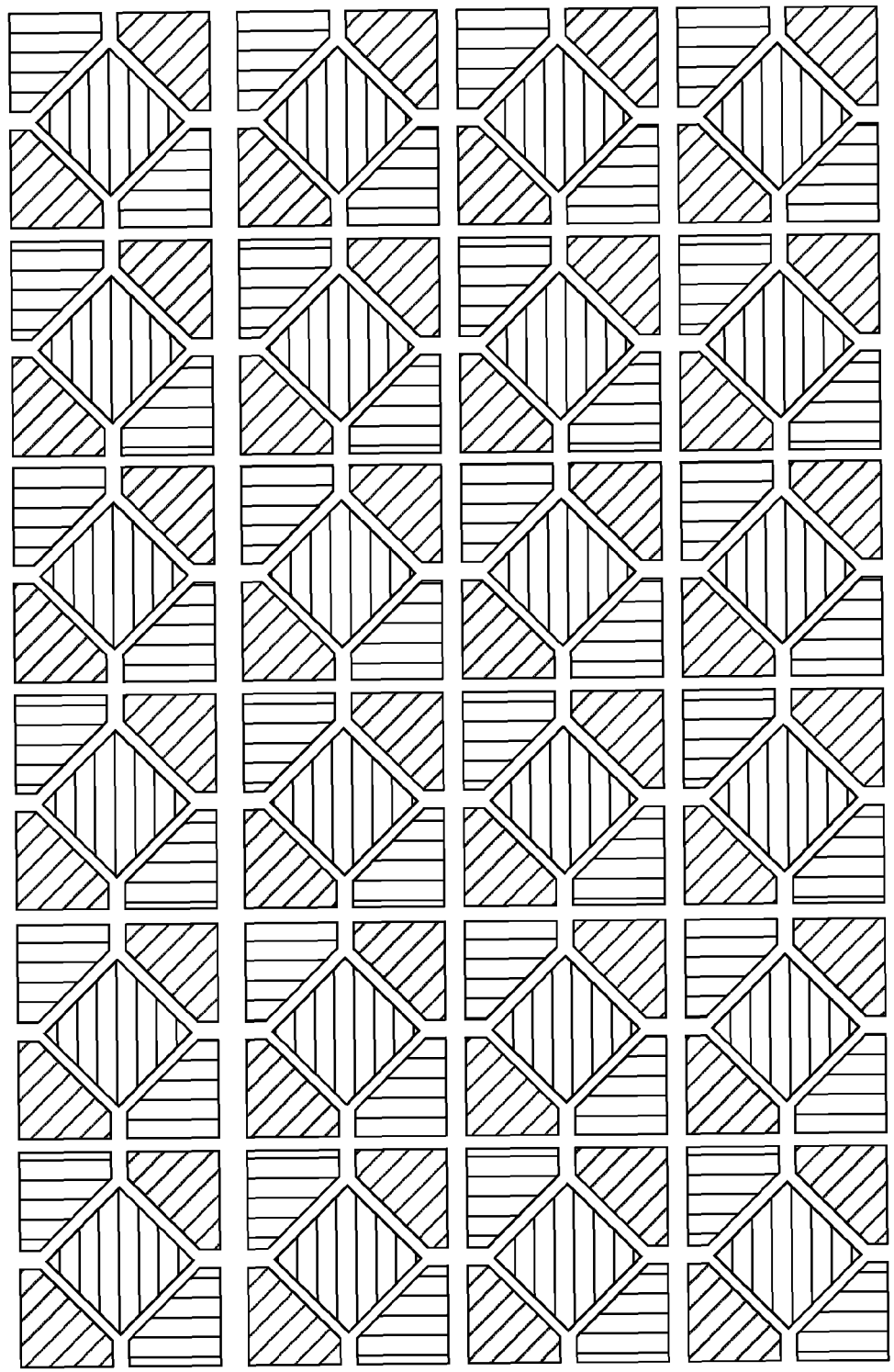
FIG. 21 shows another arrangement of subpixels of an electronic color display.
Figure 22:
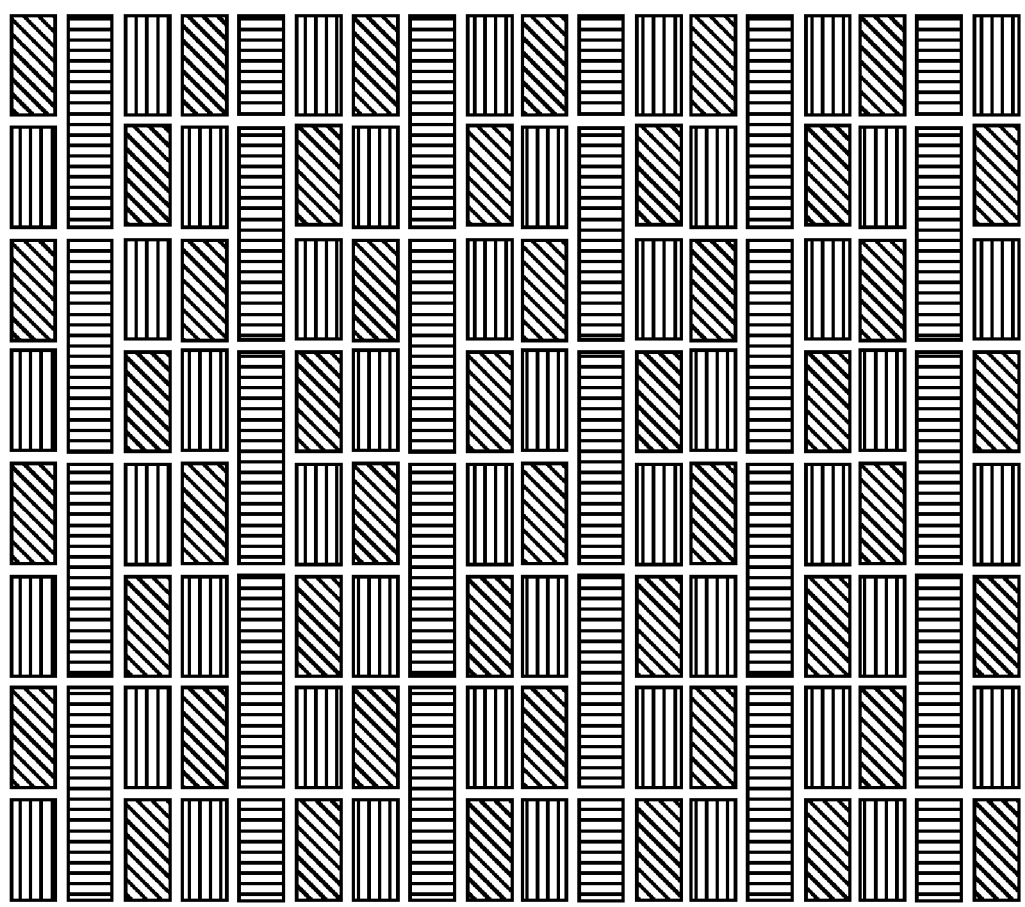
FIG. 22 shows yet another arrangement of subpixels of an electronic color display.
Figure 23:
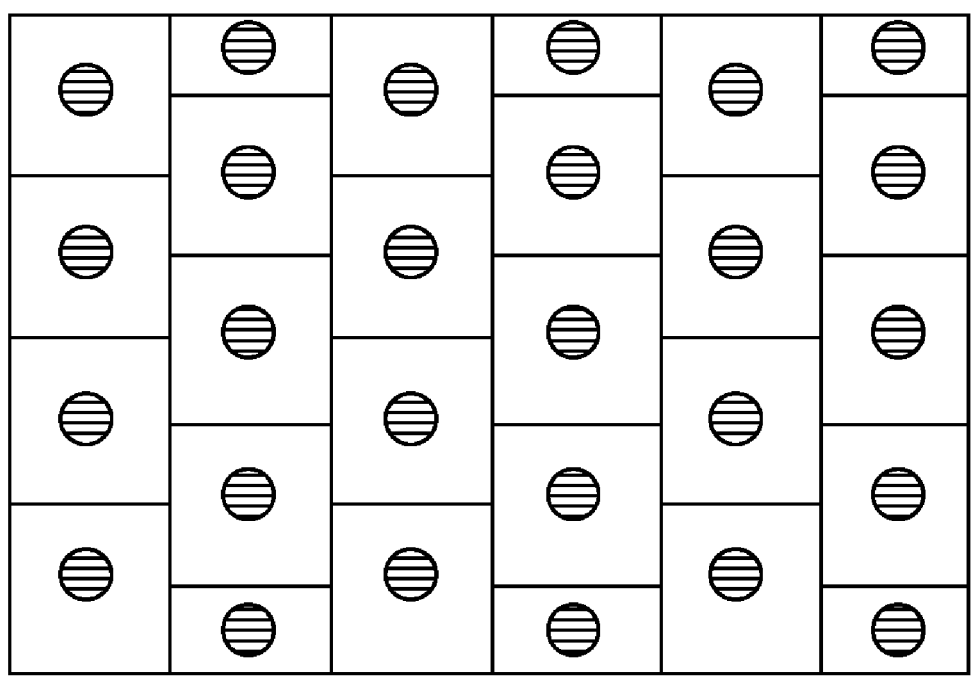
FIG. 23 shows the minority color plane reconstruction points of FIG. 22 and associated resample plane.

The "blue" resample operation of FIG. 17C may also be used to extract the pre-subpixel rendered data values for the four color arrangement of subpixels of FIGS. 2 and 3 instead of the subpixel rendering algorithm described in the patent applications incorporated above. In addition, the pre-subpixel rendered image may also be displayed on electronic displays such as those shown in FIG. 20 by averaging two values of blue data 1712 from, the values coming from diagonally adjacent "pixels" 1701. Furthermore, the displays may also have subpixel arrangements such as those shown in FIGS. 21 and 22. The subpixel arrangement of FIG. 21 is further disclosed in the above-referenced '110 application. In addition, the pre-subpixel rendered image may also be displayed on electronic displays such as those shown in FIG. 20 by averaging two values of blue data 1712 from, the values coming from diagonally adjacent "pixels" 1701, but from staggered resample areas (as depicted in FIG. 23) derived from the subpixel arrangement shown in FIG. 22, which is a variation of a subpixel arrangement first shown in the '110 application.

In another embodiment of the invention, the pre-subpixel rendered image subset and/or the conventional image subset may have embedded within an ordinary appearing image, a "watermark" that a subpixel rendering system and/or algorithm would recognize. When the subpixel rendering system detects the presence of the watermark, it knows that a subset of the image is a pre-subpixel rendered image that may be extracted and displayed with no further filtering. The watermark may be a stegnographically hidden data set, that is, data modification that is perceptually indistinguishable by a human viewer, but is recognizable by a machine, such techniques being well known in the art.

In yet another embodiment of the invention, the pre-subpixel rendered image subset is embedded in the surrounding other data set and has a predefined color key to identify the first data set as pre-subpixel rendered data. There are many occasions when it is desirable for there to be higher quality rendering of some portions or elements within a given displayed image while maintaining the rendering of other portions. For example, text may be subpixel rendered at higher quality than a photograph. Thus, one embodiment provides a system and method of allowing pre-subpixel rendered portions of images to be mixed with non-pre-subpixel rendered portions of images in such a manner as to allow for detection and suitable differential treatment of the two types of image elements.

Figure 18:
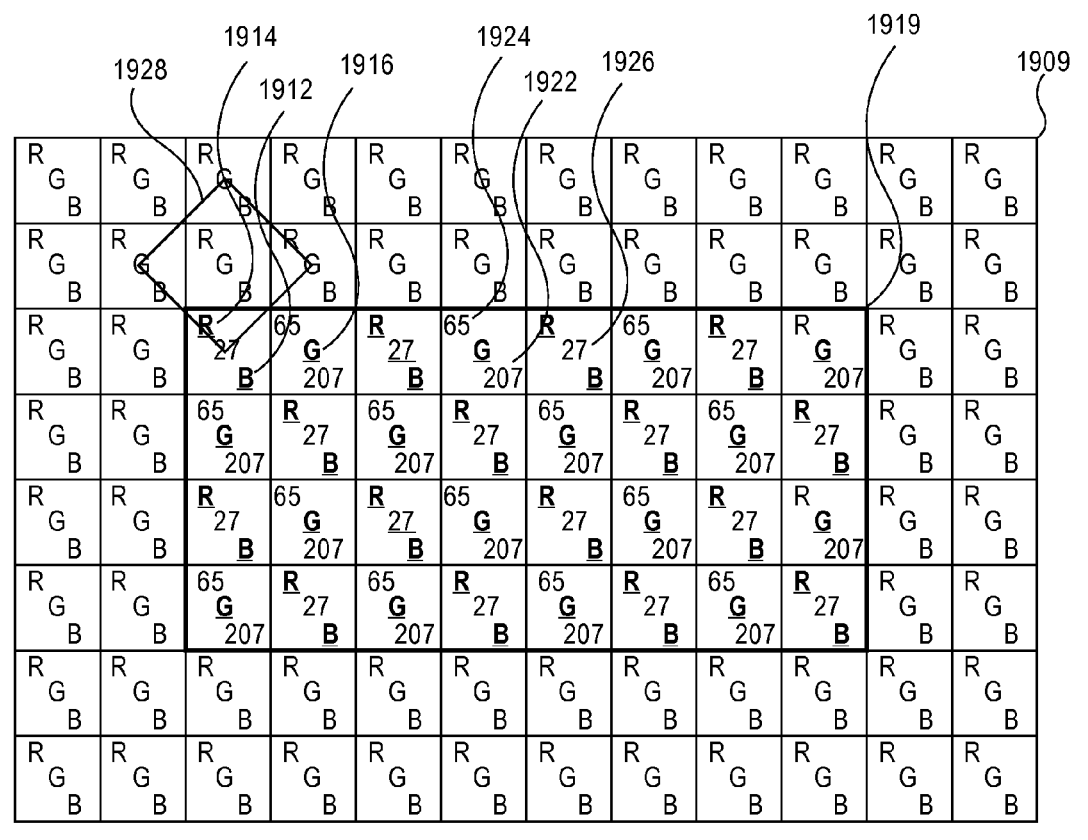

Referring to FIG. 18, conventional image data set 1909 surrounds an embedded pre-subpixel rendered image data set 1919. The pre-subpixel rendered image data set includes red 1914, green 1916, and blue 1912 sample points. The other data subset comprises a predefined chroma key where red 1924 sample point has the numerical data value of "65" (sixty-five), green 1926 sample point has the numerical data value of "27" (twenty-seven), and blue 1922 sample point has the numerical data value of "207" (two-hundred-seven). The presence of the predefined color indicates that the other data subset is pre-subpixel rendered data and may be extracted and displayed directly.

The choice of value for the color key is semi-arbitrary. The color value may be chosen to be one that is statistically unlikely to be valid image data. The value chosen in the example of FIG. 18 may be such an unlikely one. The mapping of the color key values and pre-subpixel rendered data values within two RGB triplets is also semi-arbitrary. The order shown in FIG. 18 shows pre-subpixel red and blue values 1914 and 1912 in the same pixels with green color key values 1926 also red and blue color key values 1924 and 1922 in the same pixels as green pre-subpixel values 1916. Other remappings may have advantages, for example to be easier to detect in hardware, and all of the orders are capable of being implemented by the implementations and embodiments disclosed herein. Two other preferred embodiments of this mapping order will be described later in conjunction with FIGS. 25A-D and 26A-C.

Figure 19A:
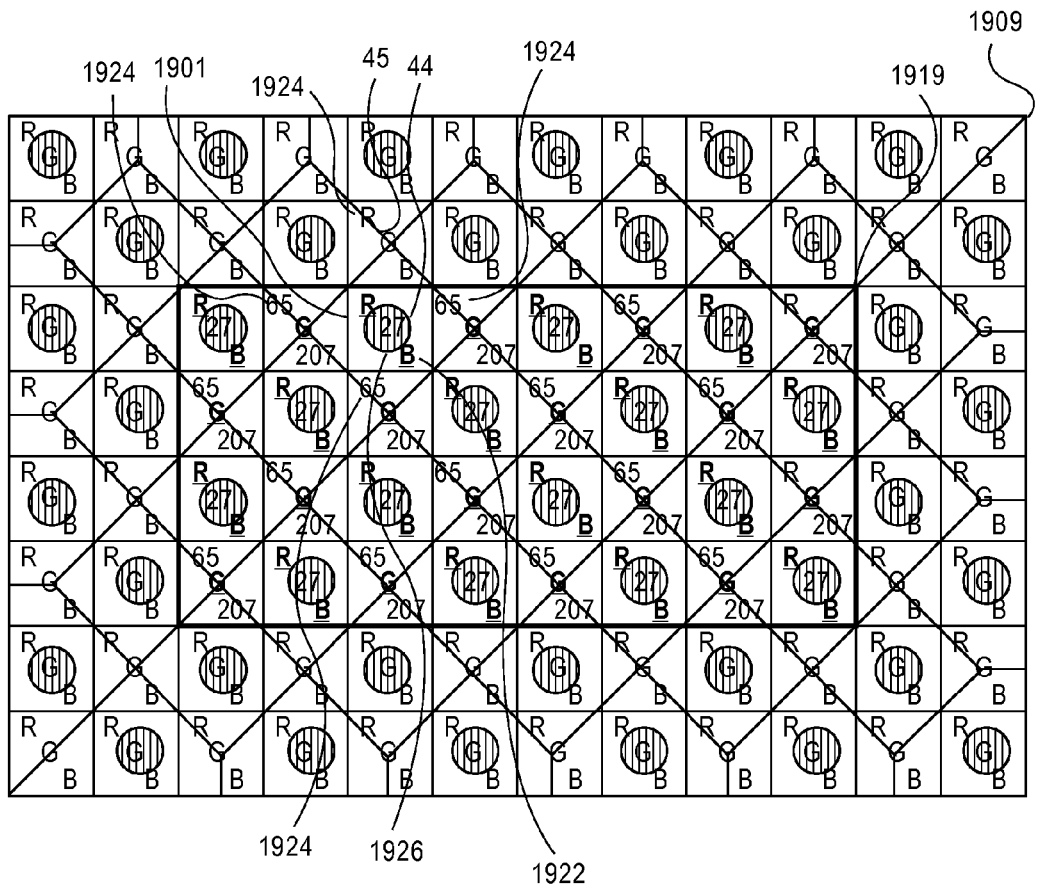
FIGS. 19A, 19B, and 19C show the red, green, and blue resample planes of FIGS. 4A, 4B, and 4C, respectively, overlaid onto data set of FIG. 18.
Figure 19B:
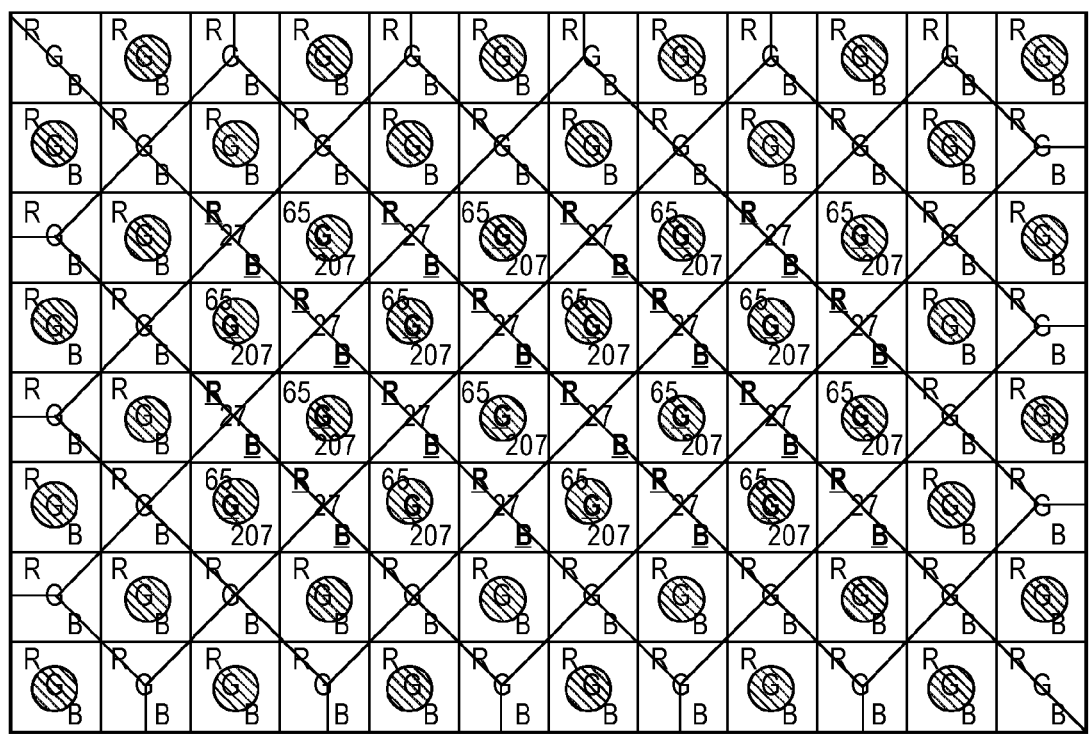
Figure 19C:
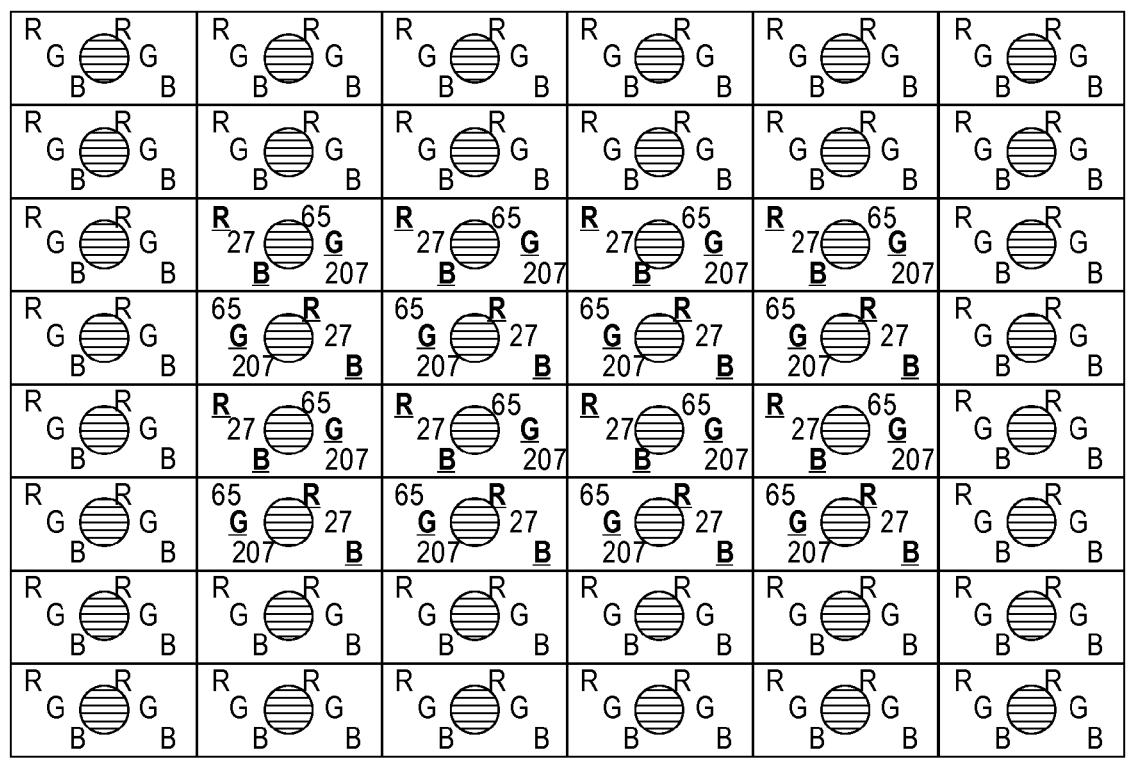

Now it is disclosed a system and method of examining the conventional image data set and of extracting the pre-subpixel rendered data subset from the conventional image data set format. Referring to FIGS. 19A, 19B, and 19C, the resample planes of FIGS. 4A, 4B, and 4C are overlaid the data set 1909 of FIG. 18, respectively. One of the resample areas of FIG. 19B is shown in FIG. 18 as resample area 1928 to illustrate a resample area overlapping an implied sample area within the pre-subpixel rendered data subset 1919. In FIG. 19A, each red resample area 45 completely overlaps one of the implied sample areas 1901, and partially overlaps several others. This is problematic at edges of pre-subpixel rendered data subset 1919, e.g., when extracting conventional image data within resample area 1928. Since the possibility exists that the red data in the completely overlapped implied sample area 1901 is part of a pre-subpixel rendered image within pre-subpixel rendered image data subset 1919, a test is performed to determine if this is the case. For instance, the subpixel rendering system examines the green 1926 value of the fully overlapped implied input sample area 1901, the red 1924 and blue 1922 values of an adjacent sample point. These values are compared to the color key value for decision.

This process is complicated because it requires expensive look-ahead methods and may use an invalid value in the pre-subpixel rendered data subset 1919 when extracting an image from the conventional image data set 1909 if the full surrounding data set is not fully tested for the presence of an edge of an embedded pre-subpixel rendered image. The invalid value being a color key value for a pre-subpixel rendered image instead of a value for an image in the conventional image data set 1909. Alternative techniques are described in FIGS. 26A-C and 27A-D for various subpixel arrangement layouts that both avoid using an invalid value in a pre-subpixel rendered data subset embedded in a conventional image data set and more expensive and extensive tests, as described below, along the required duplication of valid data to replace the "missing" data point.

To further reduce the possibility of a false positive detection, several surrounding red and blue values 1924 and 1922 may be polled. If two or more of these surrounding values match the color key value, then the presence of pre-subpixel rendered image data is confirmed. Should the data indicate the presence of the color key the subpixel rendering means then knows that this is a pre-subpixel rendered data point. Knowing that there exists a pre-subpixel rendered data set, the usual subpixel rendering algorithm is suspended in favor of a simple data extraction in which the red data point 1914 is used as the output value for the associated red reconstruction point 44. The color key data values are decimated, 'thrown away.' If the surrounding sample data points do not match the color key, then the usual subpixel rendering algorithm is executed. A similar operation is performed for the green data plane as shown in FIG. 19B and the blue data plane as shown in FIG. 19C.

At the boundaries of conventional data and pre-subpixel rendered image data, the usual subpixel rendering algorithm is modified to ignore the color key sample points that are partially overlapped. The value that is in the fully overlapped, centered, implied input sample is used to fill in the missing data point value and processed in the usual manner for the subpixel rendering algorithm.

Figure 24A:
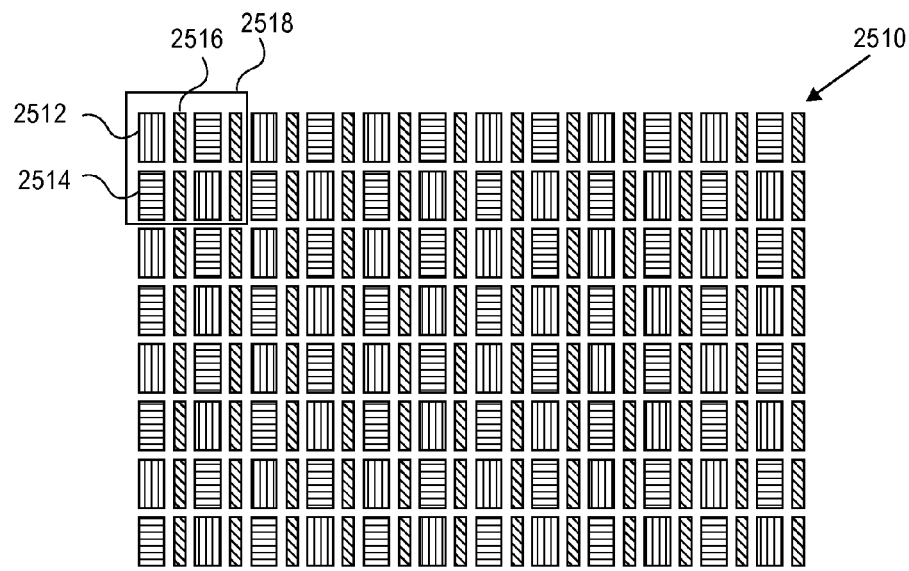
FIG. 24A shows yet another arrangement of subpixels of an electronic color display.
Figure 24B:
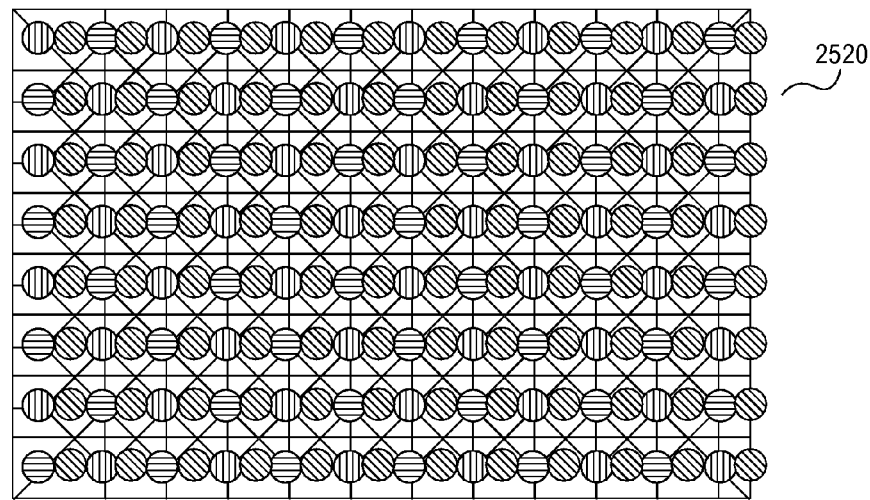
FIG. 24B shows the reconstruction points and associated resample areas for the arrangement of FIG. 24A.

Another alternative embodiment is the subpixel arrangement 2510 shown in FIG. 24A. This arrangement is further disclosed in the '719 application. The subpixel repeat arrangement 2518 comprises four green subpixels 2516 and wherein two red 2512 and two blue 2514 subpixels form a checkerboard pattern with the green subpixels interspersed. FIG. 24B depicts one possible set of reconstruction points and associated resample areas 2520 for the subpixel arrangement of FIG. 24A. Since the arrangement 2510 of FIG. 24A has four green subpixels 2516 per repeat cell 2518, the pre-subpixel rendered data set 1919 of FIG. 18 will not supply enough subpixel rendered green data points 1916.

Figure 25A:
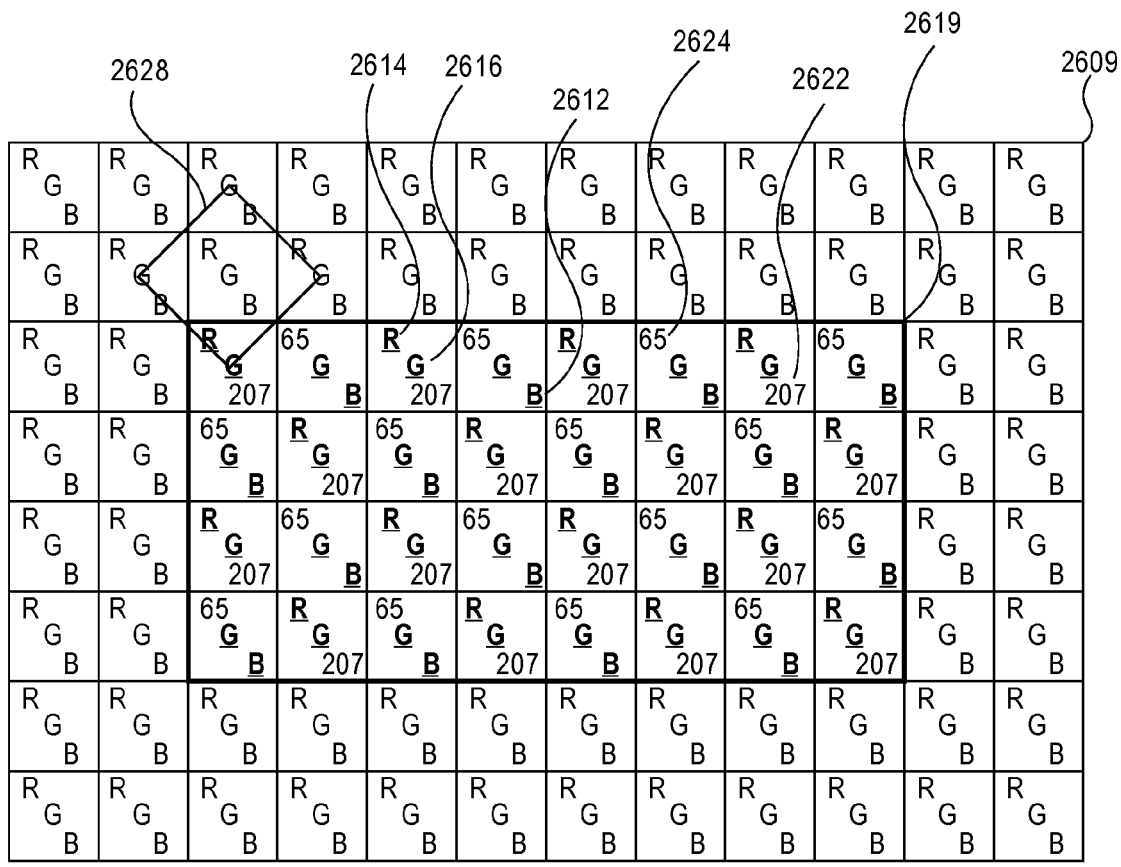
FIG. 25A shows a conventional data set with an embedded subpixel rendered data set for the arrangement of subpixel of FIG. 24A with a predefined chroma key data set.

Referring to FIG. 25A, conventional image data set 2609 surrounds an embedded pre-subpixel rendered image data set 2619. The pre-subpixel rendered image data set includes red 2614, green 2616, and blue 2612 sample points. The other data subset comprises a predefined color key where red 2624 sample point has the numerical data value of "65" (sixty-five) and blue 2622 sample point has the numerical data value of "207" (two-hundred-seven). The presence of the predefined color indicates that the other data subset is pre-subpixel rendered data and may be extracted and displayed directly. It should be noted that this pre-subpixel rendered data set 2619 has the proper number and mapped positions to match the arrangement of subpixels 2510 of FIG. 24A.

Figure 25B:
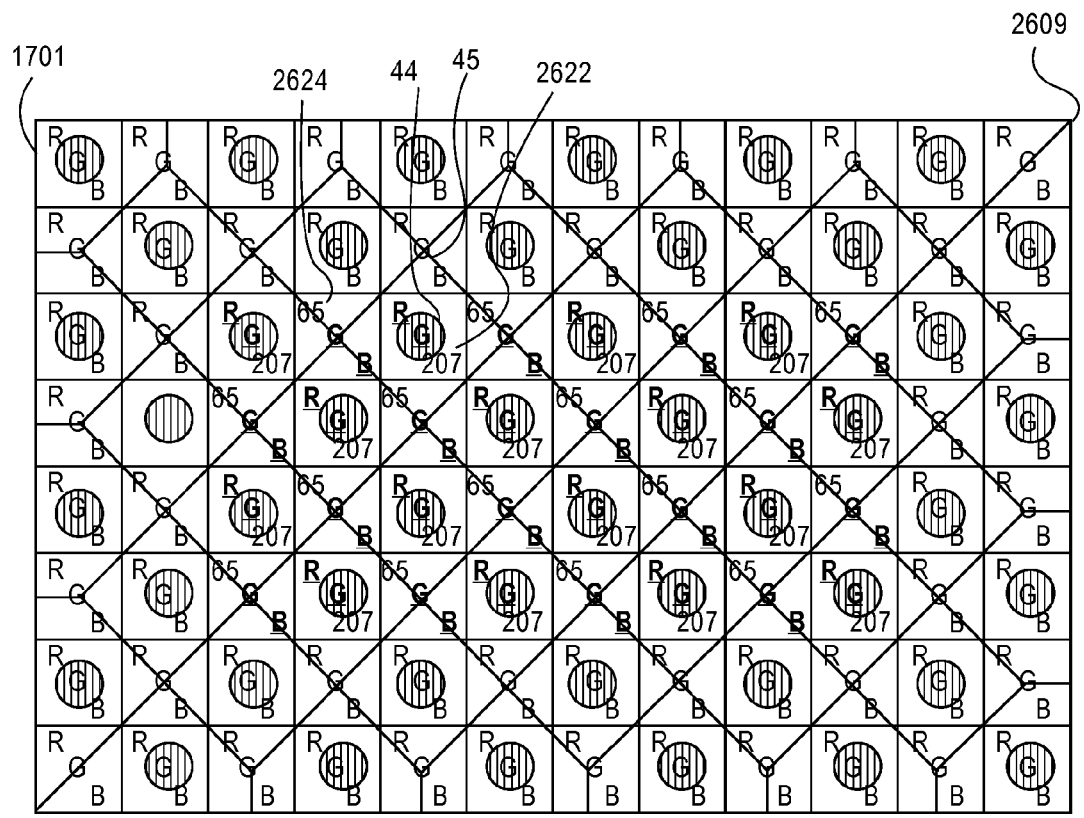
FIGS. 25B, 25C, and 25D show the red, green, and blue resample areas for the arrangement of FIG. 24A, respectively, overlaid onto the data set of FIG. 25A.
Figure 25C:
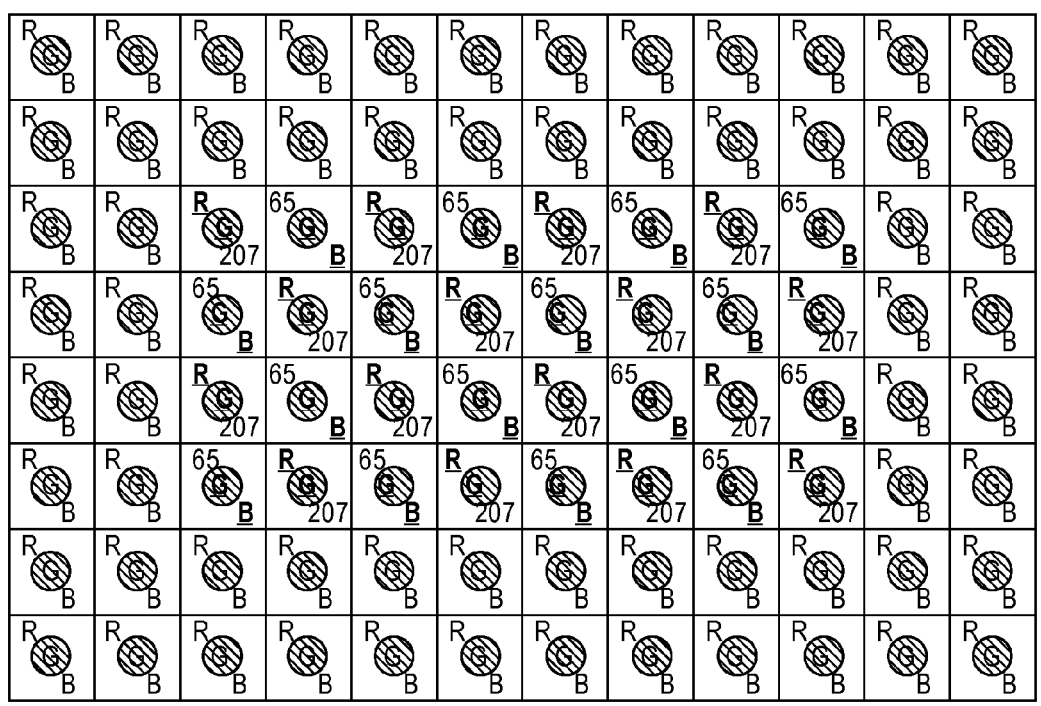
Figure 25D:
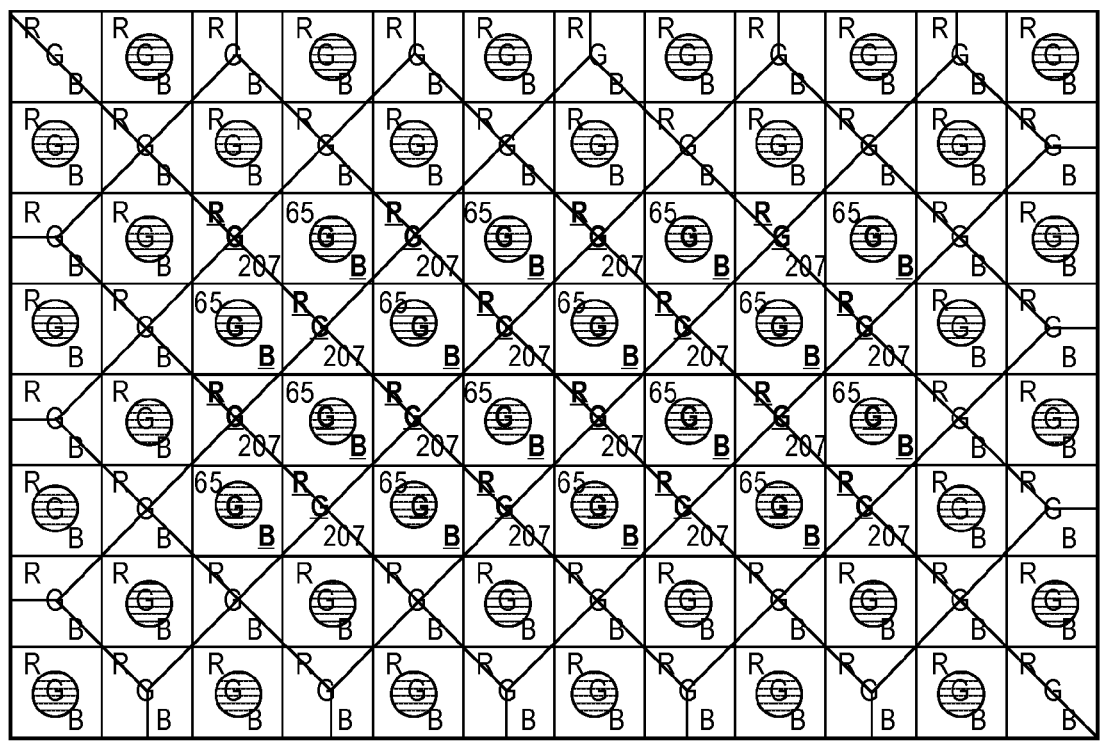

Now it will be disclosed one embodiment for extracting the pre-subpixel rendered data subset 2619 from a conventional image data set format 2609. Referring to FIGS. 25B, 25C, and 25D, the red, blue, and green resample planes of FIG. 24B are overlaid the data set 2609 of FIG. 25A, respectively. One of the resample areas of FIG. 25D is shown in FIG. 25A as resample area 2628 to illustrate a resample area overlapping an implied sample area within the pre-subpixel rendered data subset 2619. In FIG. 25B, each red resample area 45 completely overlaps one of the implied sample area "pixel" 1701, and partially overlaps several others. As mentioned previously, this is problematic at edges of pre-subpixel rendered data subset 2619 when extracting conventional image data within resample area 2628. Since the possibility exists that the red data in the completely overlapped implied sample area 1701 is part of a pre-subpixel rendered image within pre-subpixel rendered image data subset 2619, a test is performed to determine if this is the case. For instance, the subpixel rendering system examines the blue 2622 data point values of the fully overlapped implied input sample area 1701 and compares it to the color key value for decision.

This process has the same problem as described in FIG. 18 of being complicated and potentially using an invalid value in the pre-subpixel rendered data subset 2619 when extracting an image from the conventional image data set 2609. The invalid value being a color key value for a pre-subpixel rendered image instead of a value for an image in the conventional image data set 2609. As detailed below, FIGS. 26A-C and 27A-D illustrate image processing techniques for various subpixel arrangement layouts that avoid using an invalid value in a pre-subpixel rendered data subset embedded in a conventional image data set, while avoiding more complicated color key detection and valid data duplication steps.

To further reduce the possibility of a false positive detection, the surrounding red 2624 values may be polled. If two or more of these red 2624 values match the color key value, then the presence of pre-subpixel rendered image data is confirmed. Should the data indicate the presence of the color key the subpixel rendering means then knows that this is a pre-subpixel rendered data point. Knowing that there exists a pre-subpixel rendered data set, the usual subpixel rendering algorithm is suspended in favor of a simple data extraction in which the red data point 2614 is used as the output value for the associated red reconstruction point 44. The color key data values are decimated, 'thrown away'. If the surrounding sample data points do not match the color key, then the usual subpixel rendering algorithm is executed. A similar operation is performed for the blue data plane as shown in FIG. 25C and for the green data plane as shown in FIG. 25D.

At the boundaries of conventional data and pre-subpixel rendered image data, the usual subpixel rendering algorithm is modified to ignore the color key sample points that are partially overlapped. The value that is in the fully overlapped, centered, implied input sample is used to fill in the missing data point value and processed in the usual manner for the subpixel rendering algorithm.

Figure 26A:
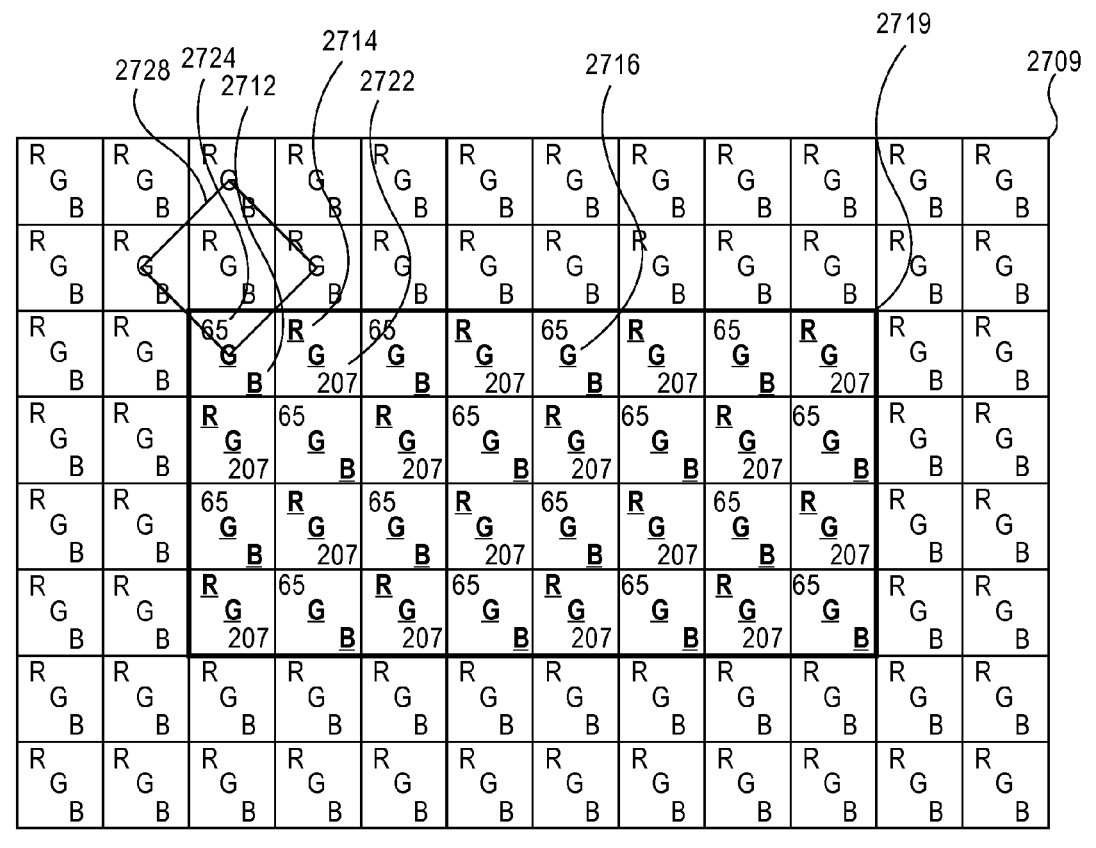

Referring to FIG. 26A, conventional image data set 2709 surrounds an embedded pre-subpixel rendered image data set 2719. The subpixel arrangement for the pre-subpixel rendered image data set 2719 is the same as pre-subpixel rendered image data set 2619 of FIG. 25A, except that the red sample points and red color keys have been swapped as well as the blue sample points and blue color keys. For instance, the values of every other column of the pre-subpixel rendered image data set 2619 are exchanged in the pre-subpixel rendered image data set 2719. The pre-subpixel rendered image data set includes red 2714, green 2716, and blue 2712 sample points. The other data subset comprises a predefined color key where red 2724 sample point has the numerical data value of "65" (sixty-five) and blue 2722 sample point has the numerical data value of "207" (two-hundred-seven). In contrast to FIG. 25A, the red numerical values "65" have been swapped with the red sample points and the blue numerical values "207" have been swapped with the blue sample points in FIG. 26A. The presence of the predefined color indicates that the other data subset is pre-subpixel rendered data and may be extracted and displayed directly. It should be noted that this pre-subpixel rendered data set 2719 has the same number but remapped positions from the pre-subpixel rendered data set 2619 of FIG. 25A. The remapped red and blue data points and color key allow for a simplified detection method, reducing the complexity and cost of the subpixel rendering means the includes a means for detecting and properly handing embedded pre-subpixel rendered data sets.

Figure 26B:
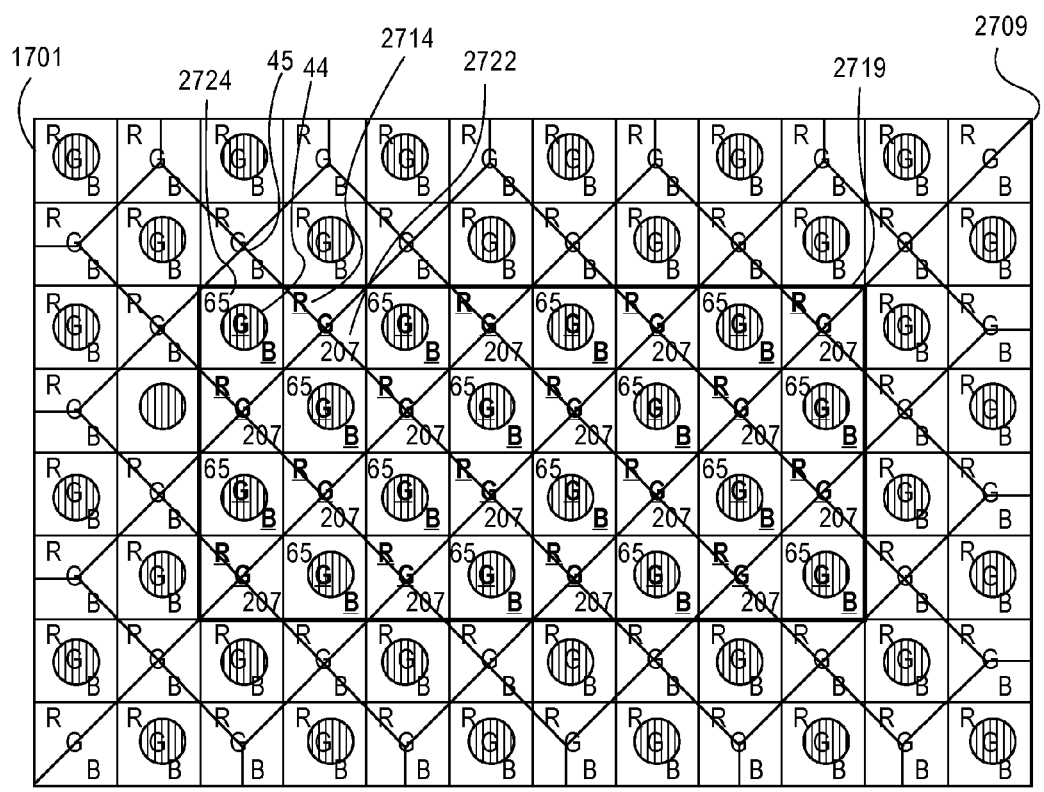
FIGS. 26B and 26C show the red and blue resample areas for the arrangement of FIG. 25A, respectively, overlaid onto the data set of FIG. 26.
Figure 26C:
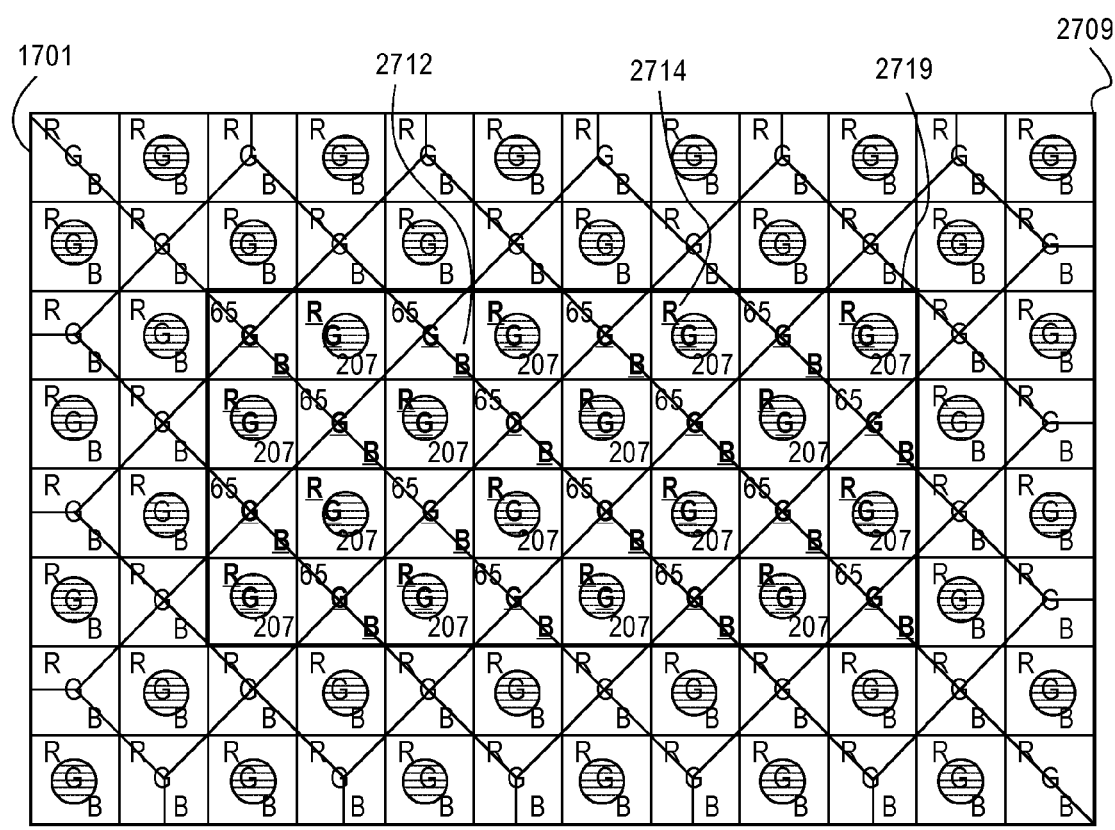

Now it will be disclosed one embodiment for extracting the alternative pre-subpixel rendered data subset 2719 from a conventional image data set format 2709. Referring to FIGS. 26B and 26C, the red and blue resample planes of FIG. 24B are overlaid the data set 2709 of FIG. 26A, respectively. One of the resample areas of FIG. 26C is shown in FIG. 26A as resample area 2728 to illustrate a resample area overlapping an implied sample area within the pre-subpixel rendered data subset 2719. In FIG. 26B, each red resample area 45 completely overlaps one of the implied sample area "pixel" 1701, and partially overlaps several others. Since the possibility exists that the red data in the completely overlapped implied sample area 1701 is part of a pre-subpixel rendered image, a test is performed to determine if this is the case. The subpixel rendering system first examines the red 2724 data point value of the fully overlapped implied input sample area 1701 and compares it to the color key value for decision. Because the red color key "65" is present in the pre-subpixel rendered image data subset 2719, the test suggests that this might be part of a color key and further test of surrounding values is warranted.

To further reduce the possibility of a false positive detection, the surrounding blue 2722 values may be polled. If one or more of these blue 2722 values match the color key value, then the presence of pre-subpixel rendered image data is confirmed. Should the data indicate the presence of the color key the subpixel rendering means then knows that this is a pre-subpixel rendered data point. Knowing that there exists a pre-subpixel rendered data set, the usual subpixel rendering algorithm is suspended in favor of a simple data extraction in which the red data point 2714 is used as the output value for the associated red reconstruction point 44. Note that the associated red pre-subpixel rendered data sample is shifted to the pixel 1701 to the right on odd rows and shifted by one pixel to the left on even rows. The color key data values are decimated, 'thrown away'. If the sample data points do not match the color key, then the usual subpixel rendering algorithm is executed. A similar operation is performed for the blue data plane as shown in FIG. 26C. Here however, the blue pre-subpixel rendered sample 2712 is shifted one pixel 1701 to the left on odd rows and one pixel 1701 to the right on even rows, the opposite as the shifts occurring to the red pre-subpixel rendered samples 2714.

At the boundaries of conventional data and pre-subpixel rendered image data, the usual subpixel rendering algorithm is processed in the usual manner for the subpixel rendering algorithm since a pre-subpixel rendered data point may be substituted for a non-pre-subpixel rendered data point with little if any error. Thus the remapped pre-subpixel rendered data set 2719 simplifies the detector, since only one first test need to made to know that the overlapped data points may be processed in the usual fashion, namely testing the center self color value for the color key. Only if that first color key value is determined to match need any other values be tested in sequence. Further since if there is no match to that center value, even if the area resample area should overlap pre-subpixel rendered data, the normal subpixel rendering operations may be performed since valid data exists in all overlapped areas.

The above "swapping" technique illustrated in FIG. 26A essentially reverses a red and green checkerboard patter inside pre-subpixel rendered image data subset 2719 as compared with the pre-subpixel rendered image data subset 2619 in FIG. 25A. In this manner, the extraction process is guaranteed of finding a reasonable value instead of an "invalid value" inside the pre-subpixel rendered image data subset. As a result, the test described in FIG. 25A can be avoided, thereby saving processing time.

Figure 27A:
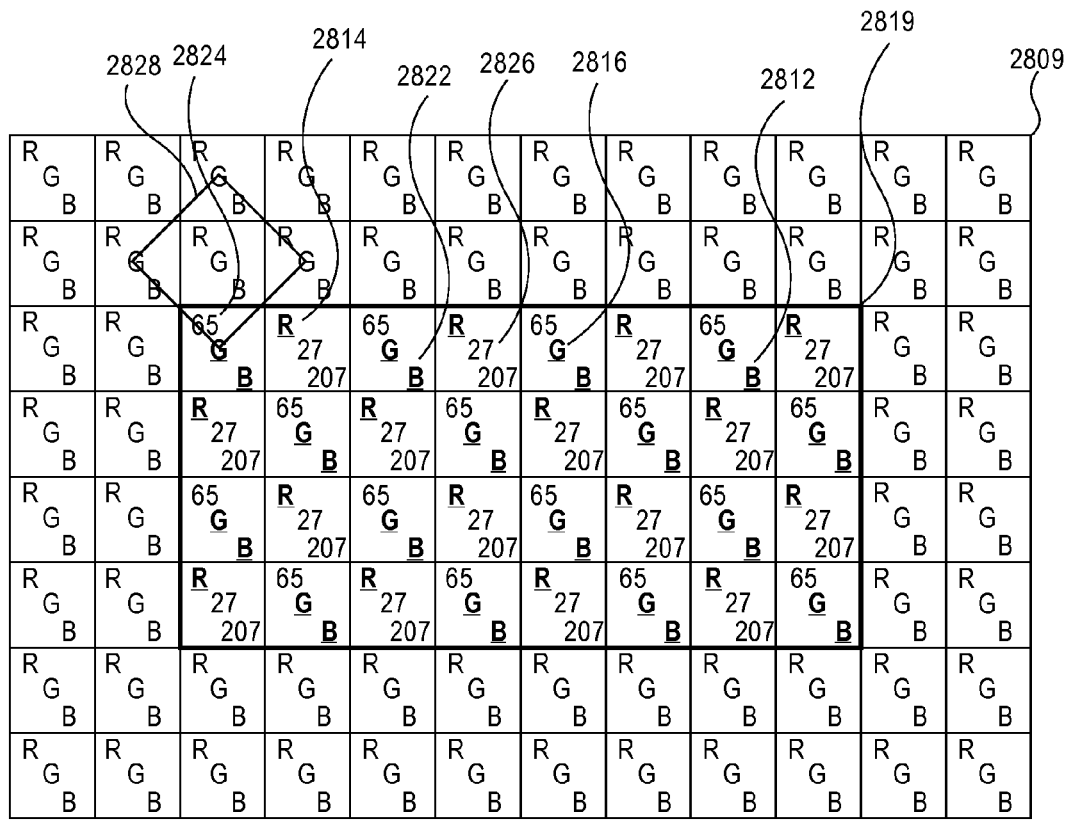
FIG. 27A shows a conventional data set with an embedded subpixel rendered data set for the arrangement of subpixel of FIG. 1 with an alternative predefined chroma key data set.

Referring to FIG. 27A, conventional image data set 2809 surrounds an embedded pre-subpixel rendered image data set 2819. The subpixel arrangement for the pre-subpixel rendered image data set 2819 is the same as pre-subpixel rendered image data subset 1919 of FIG. 18, except that the red sample points and red color keys have been swapped as well as the green sample points and green color keys. The pre-subpixel rendered image data set includes red 2814, green 2816, and blue 2812 sample points. The other data subset comprises a predefined color key where red 2824 sample point has the numerical data value of "65" (sixty-five), green 2826 sample point has the numerical data value of "27" (twenty-seven), and blue 2822 sample point has the numerical data value of "207" (two-hundred-seven). In contrast to FIG. 18, the red numerical values "65" have been swapped with the red sample points and the green numerical values "27" have been swapped with the green sample points in FIG. 27A. The presence of the predefined color indicates that the other data subset is pre-subpixel rendered data and may be extracted and displayed directly. Note that this pre-subpixel rendered data set 2819 has the same number but remapped positions from the pre-subpixel rendered data set 1919 of FIG. 18. The remapped red and green data points and color key allow for a simplified detection method, reducing the complexity and cost of the subpixel rendering means that includes a means for detecting and properly handing embedded pre-subpixel rendered data sets.

Figure 27B:
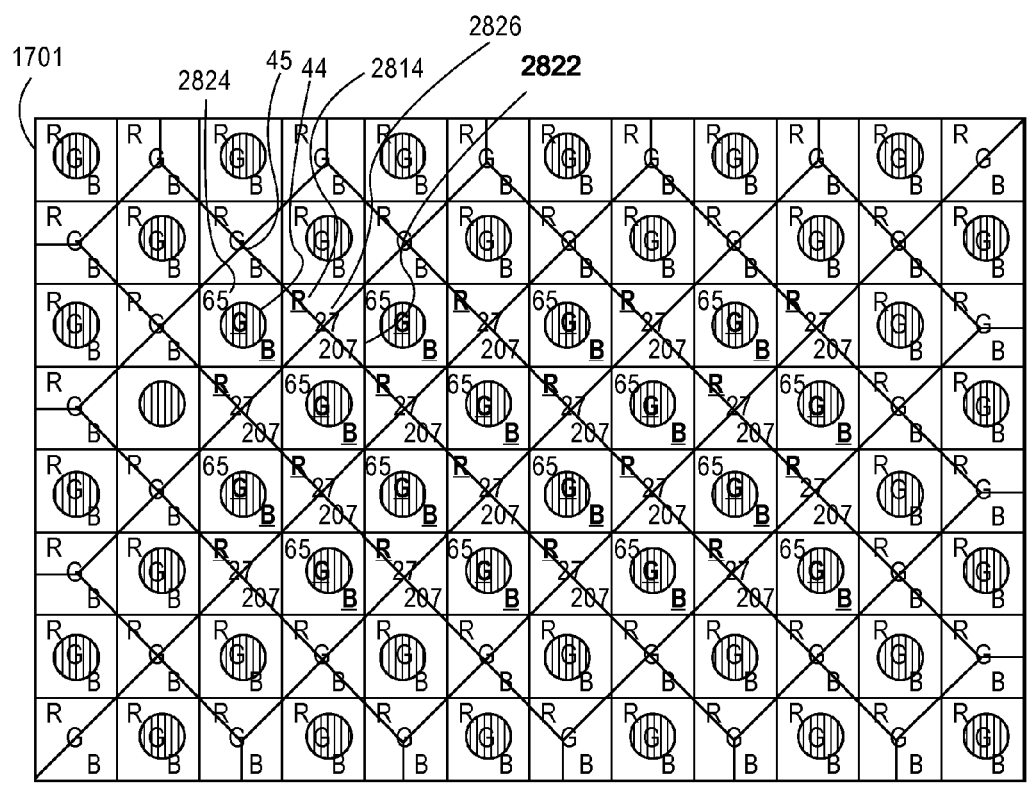
FIGS. 27B, 27C, and 27D show the red, green, and blue resample areas for the arrangement of FIG. 1, FIGS. 4A, 4B, and 4C, respectively, overlaid onto the data set of FIG. 27A.
Figure 27C:
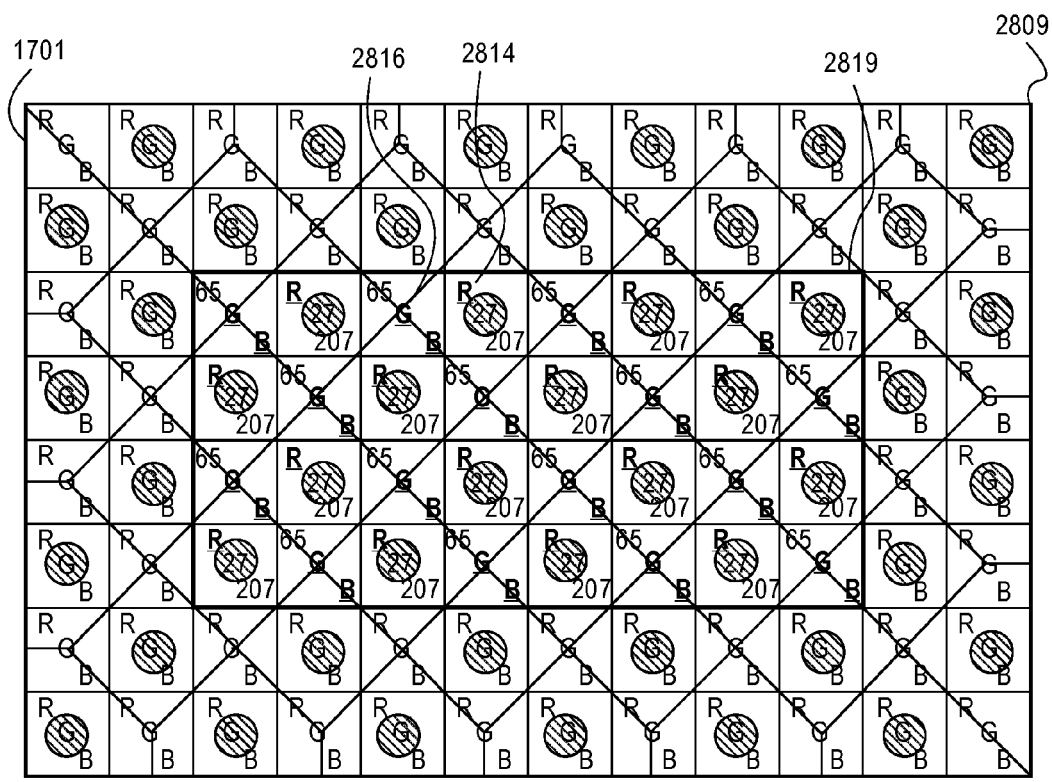
Figure 27D:
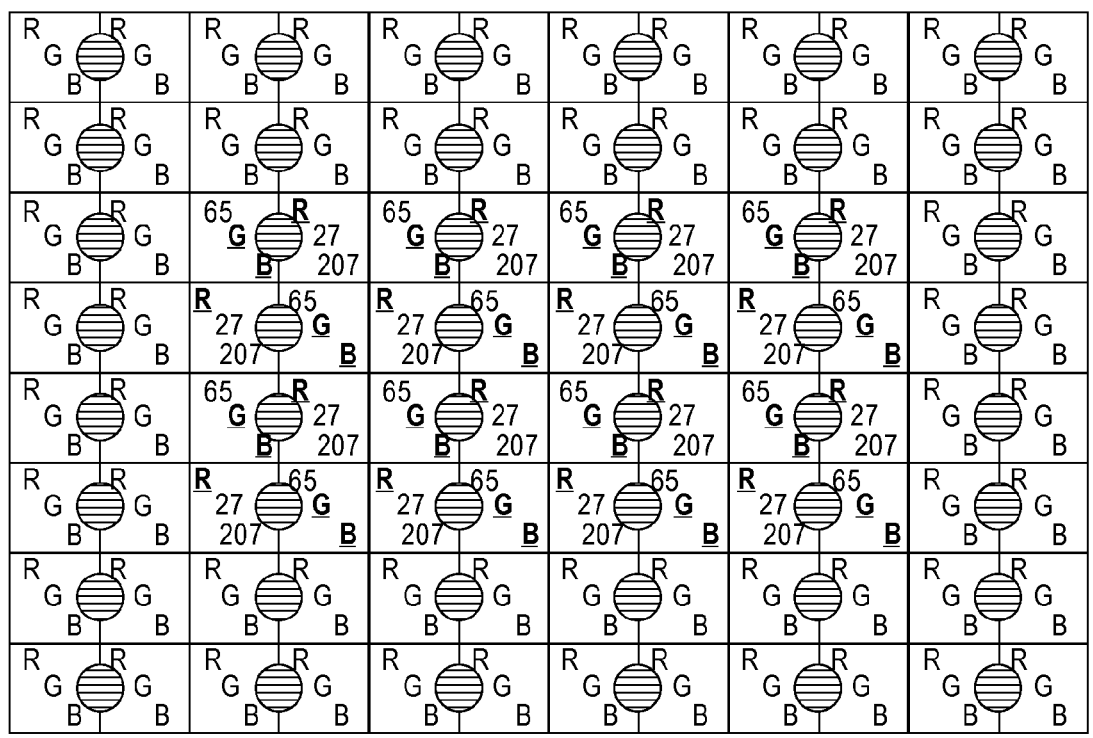

Now it will be disclosed one embodiment for extracting the alterative pre-subpixel rendered data subset 2819 from a conventional image data set format 2809. Referring to FIGS. 27B, 27C, and 27D, the red, green, and blue resample planes of FIGS. 4A, 4B, and 4C are overlaid the data set 2809 of FIG. 27A, respectively. One of the resample areas of FIG. 27C is shown in FIG. 27A as resample area 2828 to illustrate a resample area overlapping an implied sample area within the pre-subpixel rendered data subset 2819. In FIG. 27B, each red resample area 45 completely overlaps one of the implied sample area "pixel" 1701, and partially overlaps several others. Since the possibility exists that the red data in the completely overlapped implied sample area 1701 is part of a pre-subpixel rendered image, a test is performed to determine if this is the case. The subpixel rendering system first examines the red 2824 data point value of the fully overlapped implied input sample area 1701 and compares it to the color key value for decision. Because the red color key "65" is present in the pre-subpixel rendered image data subset 2819, the test suggests that this might be part of a color key and further testing of surrounding values is warranted.

To further reduce the possibility of a false positive detection, the surrounding blue 2822 and green 2826 values may be polled. If two or more of these blue 2822 and green 2826 values match the color key value, then the presence of pre-subpixel rendered image data is confirmed. Should the data indicate the presence of the color key the subpixel rendering means then knows that there is a pre-subpixel rendered data point. Knowing that there exists a pre-subpixel rendered data set, the usual subpixel rendering algorithm is suspended in favor of a simple data extraction in which the red data point 2814 is used as the output value for the associated red reconstruction point 44. Note that the associated red pre-subpixel rendered data sample is shifted to the pixel 1701 to the right on odd rows and shifted by one pixel to the left on even rows. The color key data values are decimated, 'thrown away'. If the sample data points do not match the color key, then the usual subpixel rendering algorithm is executed. Similar operations are performed for the green and blue data planes as shown in FIGS. 27C and 27D. Here however, the green pre-subpixel rendered sample 2816 is shifted one pixel 1701 to the left on odd rows and one pixel 1701 to the right on even rows, the opposite as the shifts occurring to the red pre-subpixel rendered samples 2814.

At the boundaries of conventional data and pre-subpixel rendered image data, the usual subpixel rendering algorithm is processed in the usual manner for the subpixel rendering algorithm since a pre-subpixel rendered data point may be substituted for a non-pre-subpixel rendered data point with little if any error. Thus the remapped pre-subpixel rendered data set 2819 simplifies the detector, since only one first test need to made to know that the overlapped data points may be processed in the usual fashion, namely testing the center self color value for the color key. Only if that first color key value is determined to match need any other values be tested in sequence. Further since if there is no match to that center value, even if the area resample area should overlap pre-subpixel rendered data, the normal subpixel rendering operations may be performed since valid data exists in all overlapped areas.

Similar to FIG. 26A, the above "swapping" technique illustrated in FIG. 27A essentially reverses a red and green checkerboard pattern inside pre-subpixel rendered image data subset 2819 as compared with the pre-subpixel rendered image data subset 1919 in FIG. 18. Likewise, the extraction process for FIG. 27A is guaranteed of finding a reasonable value instead of an "invalid value" inside the pre-subpixel rendered image data subset.

Regarding the above "swapping" techniques, it should be noted that other swapping methods can be used besides swapping values from every other column. For example, surrounding non-presubpixel rendered data, when being subpixel rendered, easily accessed the correct and actual color data in the embedded pre-subpixel rendered image data subset, without the need for expensive look-ahead method of determining the precise boundaries of embedded pre-subpixel rendered image data subsets. Such other schemes might include, but are not limited to, swapping rows or other known geometric relationships. It only suffices that non-presubpixel data access corrects surrounding color data when needed.

Thus, implementations and embodiments have been described for processing image data sets with embedded pre-subpixel rendered image. In the foregoing specification, the invention has been described with reference to specific exemplary implementations and embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for displaying an image, the method comprising:
    pre-subpixel rendering source image data;
    noting a point in an input image data stream in which to embed the pre-subpixel rendered source image data, wherein the input image is not subpixel rendered;
    selectively swapping values of the pre-subpixel rendered source image data,
    embedding the swapped and unswapped pre-subpixel rendered data into the input image so as to generate a mixed image data; and
    displaying an image on a screen based on the mixed image data.

2. The method of claim 1, wherein pre-subpixel rendering the source image data comprises:
    adding a color key into the pre-subpixel rendered source image data to indicate pre-subpixel rendering.

3. The method of claim 2, wherein adding the color key comprises:
    substituting a first predefined color key value in place of an actual first color value at a first location in the mixed image data; and
    substituting a second predefined color key in place of an actual second color key value at a second location in the mixed image data.

4. The method of claim 3, wherein selectively swapping values comprises:
    selectively swapping the values of pre-subpixel rendered source image data such that non-presubpixel rendered source image data surrounding the values of pre-subpixel rendered source image data-represents the correct actual color data when the non-presubpixel rendered source image data is being subpixel rendered.

5. The method of claim 3, wherein selectively swapping values further comprises:
    swapping values of every other column of the pre-subpixel rendered source image data.

6. The method of claim 1, wherein the displaying an image further comprises:
    recognizing and extracting the pre-subpixel rendered source image data within the mixed image data; and
    displaying the pre-subpixel rendered source image data.

7. The method of claim 6, wherein the displaying an image further comprises:
    subpixel rendering the input image; and
    displaying the subpixel rendered input image.

8. The method of claim 6, wherein either the pre-subpixel rendered source image data or the input image includes a watermark.

9. The method of claim 8, wherein the recognizing and extracting further comprises:
    detecting the watermark; and
    extracting the pre-subpixel rendered source image data associated with the watermark.

10. The method of claim 6, wherein at least one of the pre-subpixel rendered source image data and the input image includes a color key.

11. The method of claim 10, wherein the recognizing and extracting further comprises:
    detecting the color key; and
    extracting the pre-subpixel rendered source image data associated with the color key.

12. The method of claim 1, wherein the pre-subpixel rendered source and input image include respective data point values for an output image.

13. The method of claim 12, wherein the input image includes a plurality of color keys indicating the presence of the pre-subpixel rendered source image data.

14. The method of claim 13, wherein the color keys map to specific values for the data point values within the input image for the output image.

15. The method of claim 13, wherein the displaying an image further comprises:
    detecting the presence of the pre-subpixel rendered source image data by determining whether surrounding data point values around a color key value match the color key value.

16. The method of claim 15, further comprising decimating the color key value if the surrounding data point values match the color key value.

17. The method of claim 1, wherein the pre-subpixel rendering source image data further comprises:
    overlaying an idealized image onto a color sample plane that includes a plurality of sample points;
    calculating filter values for each of the sample points; and
    applying the filter values to a conventional source image data to generate a pre-subpixel rendered source image data.

* * * * *